United States Patent Office 3,147,248
Patented Sept. 1, 1964

3,147,248
15-METHYL DERIVATIVES OF CORTICAL HORMONES
Philip F. Beal III, Kalamazoo, and Robert W. Jackson, Kalamazoo Township, Kalamazoo County, Mich., assignors to The Upjohn Company, Kalamazoo, Mich., a corporation of Delaware
No Drawing. Filed July 20, 1961, Ser. No. 125,364
20 Claims. (Cl. 260—239.55)

This invention relates to novel steroidal compounds and is especially concerned with the 15α and 15β-methyl derivatives of hydrocortisone, cortisone, prednisolone, prednisone and the esters and 9α-fluoro analogues thereof.

The 15β-methyl compounds of this invention and a process for their production are illustratively represented by the following sequence of formulae:

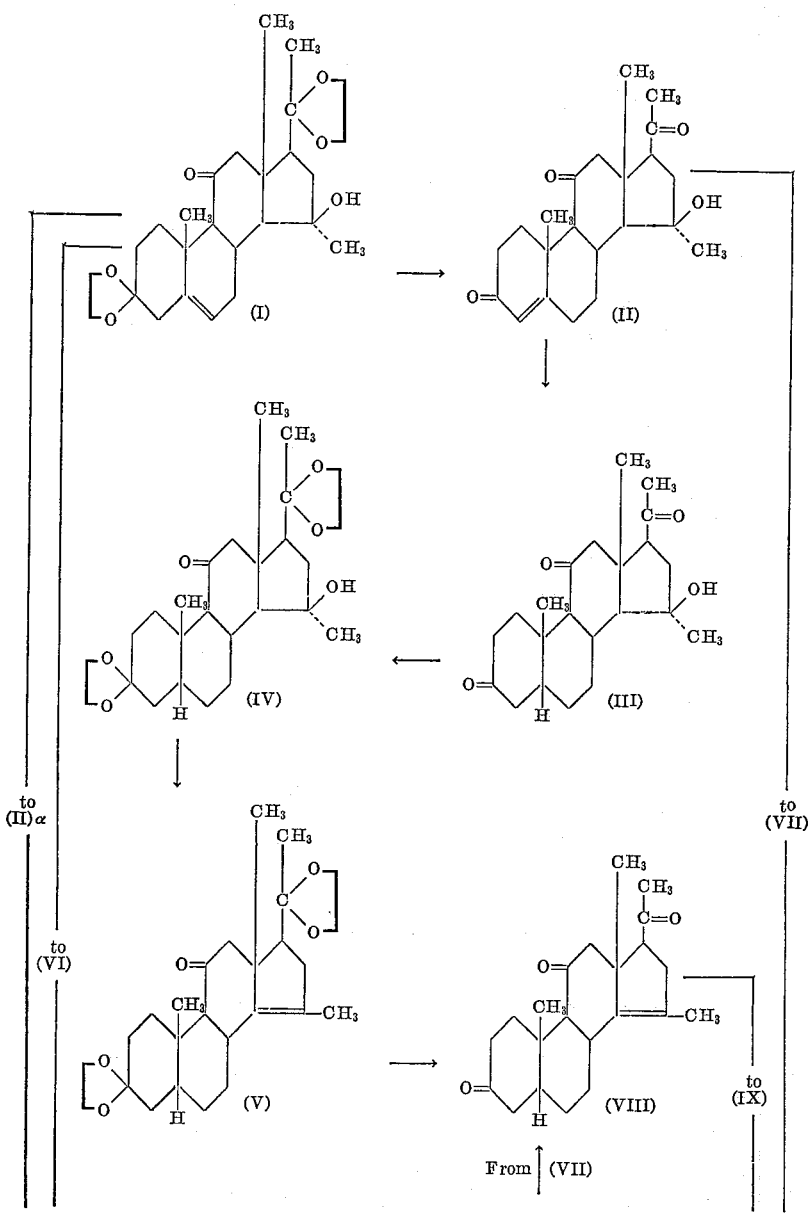

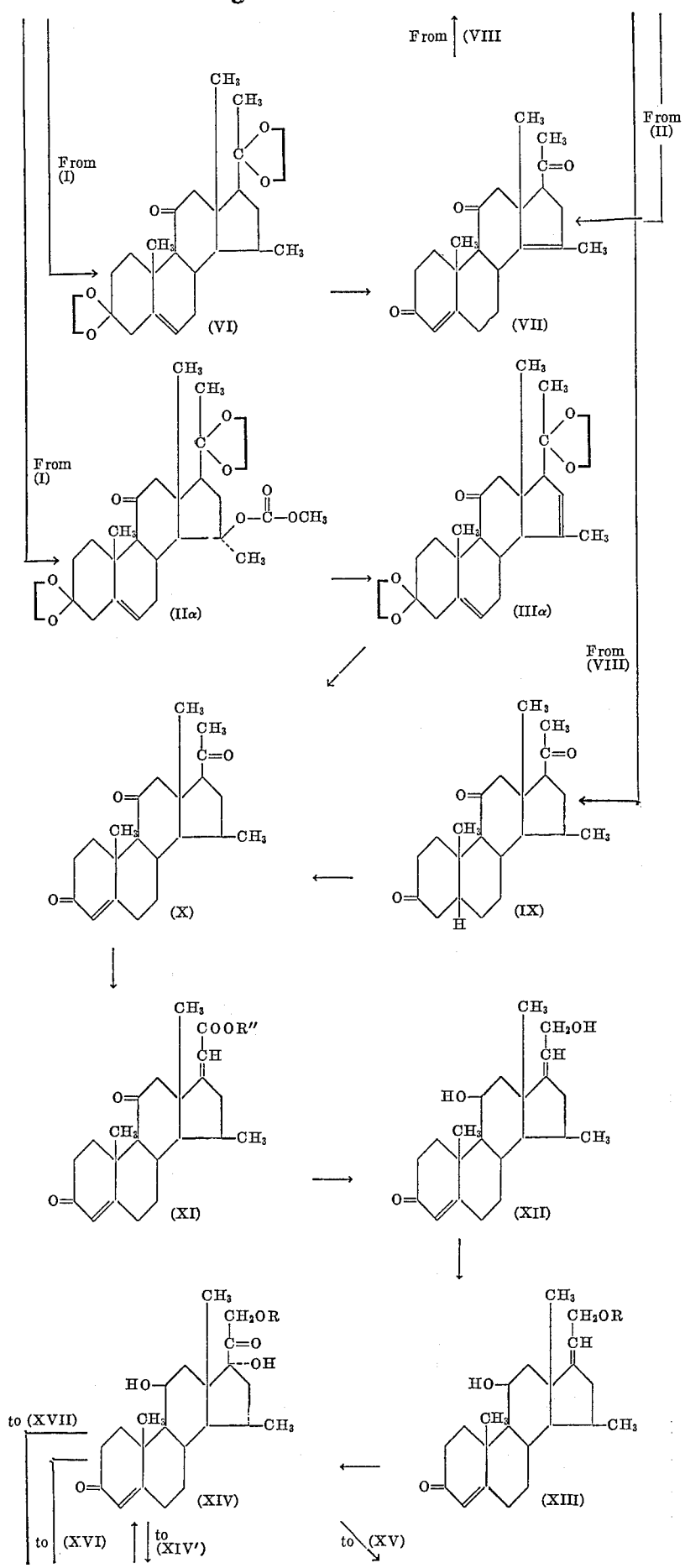

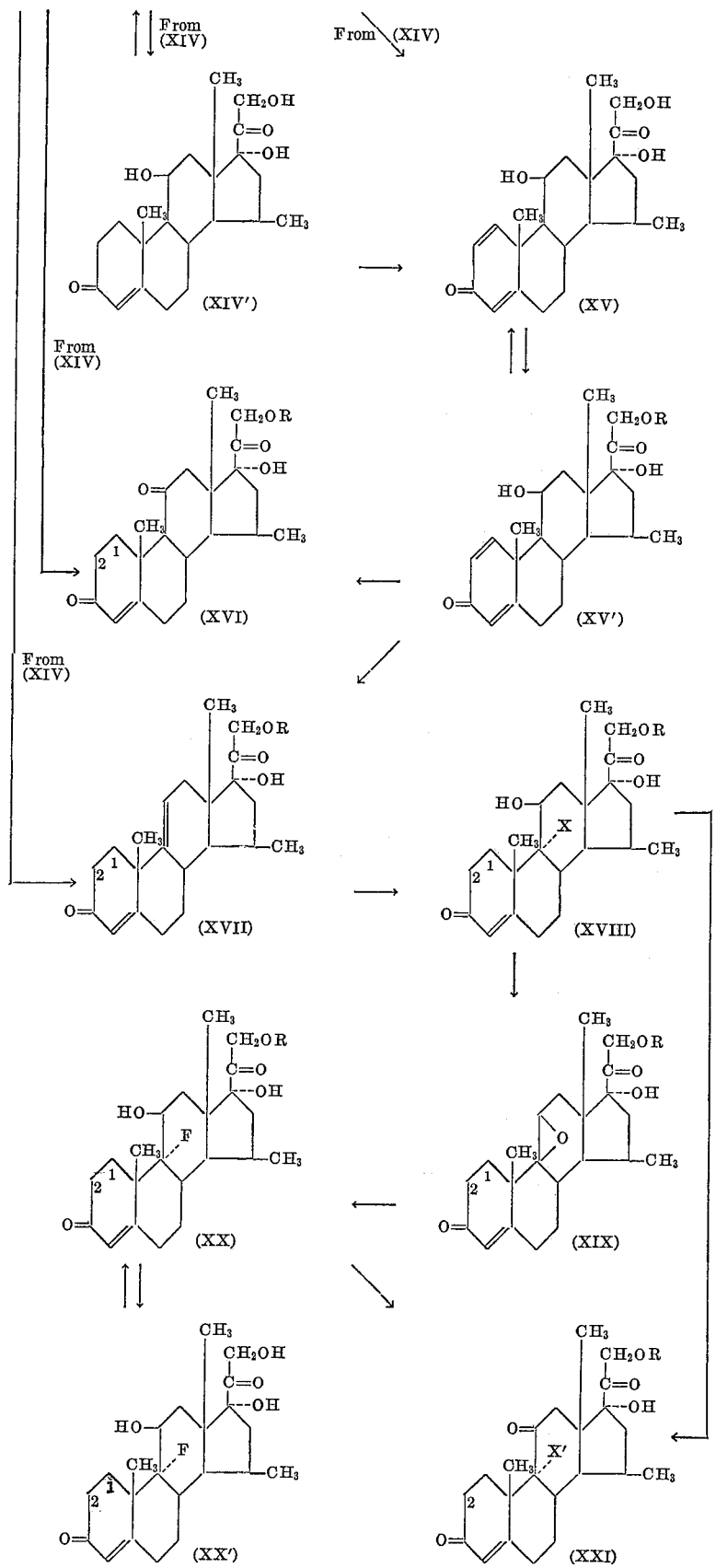
wherein the symbol  represents an alkylene ketal radical of the formula 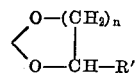

wherein *n* is selected from the integers one and two and R' is selected from the group consisting of hydrogen and a lower-alkyl radical containing from 1 to 6 carbon atoms, inclusive; R is the acyl radical of a hydrocarbon carboxylic acid containing from 1 to 12 carbon atoms, inclusive; R" is lower-alkyl, i.e., containing from 1 to 8 carbon atoms, inclusive, preferably methyl or ethyl; X is a halogen having an atomic weight from 35 to 127, inclusive, i.e., chlorine, bromine, or iodine; X' is a halogen having an atomic weight from 19 to 127, i.e., fluorine, chlorine, bromine or iodine; the 1,2-linkage is selected from the group consisting of single bonds and double bonds.

The 15α-methyl compounds of this invention and a process for their production are illustratively represented by the following sequence of formulae:

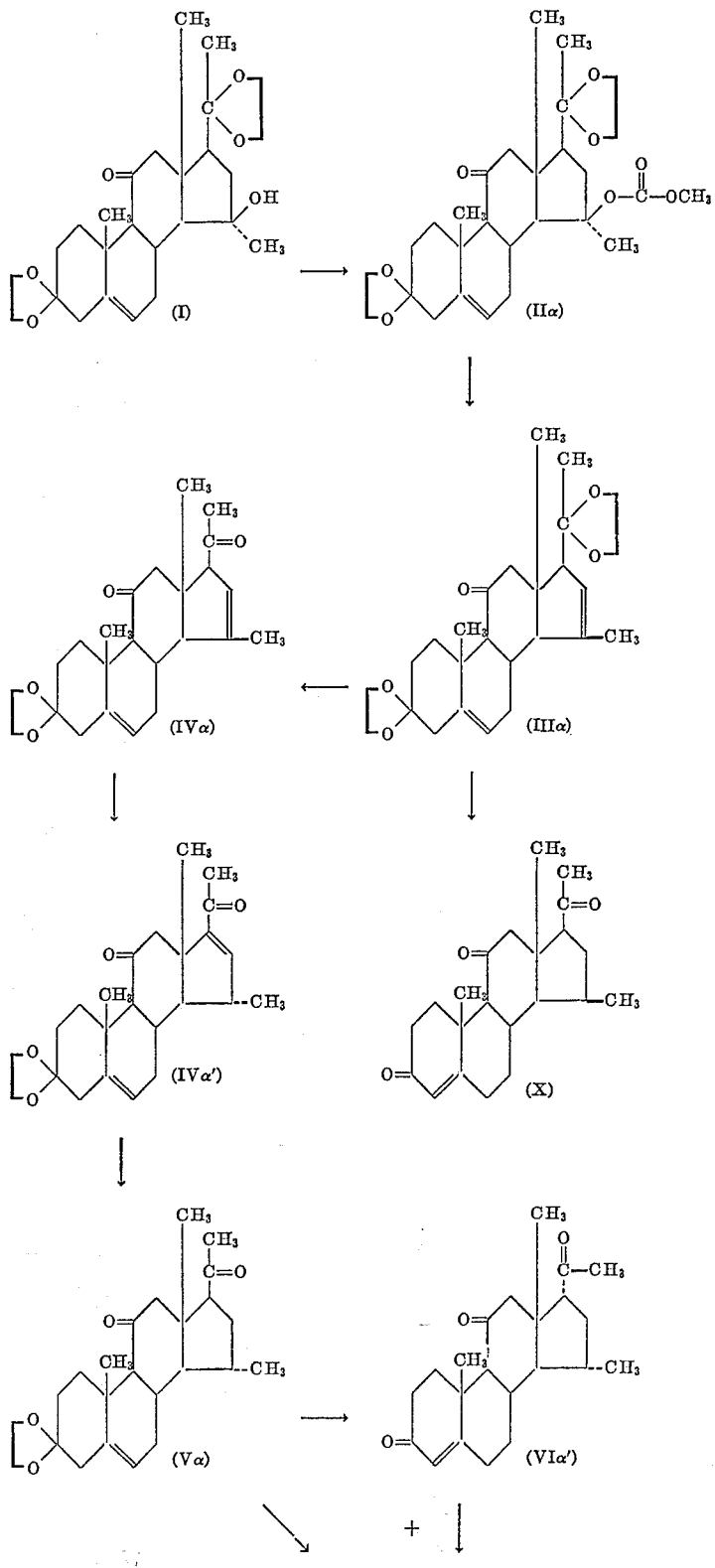

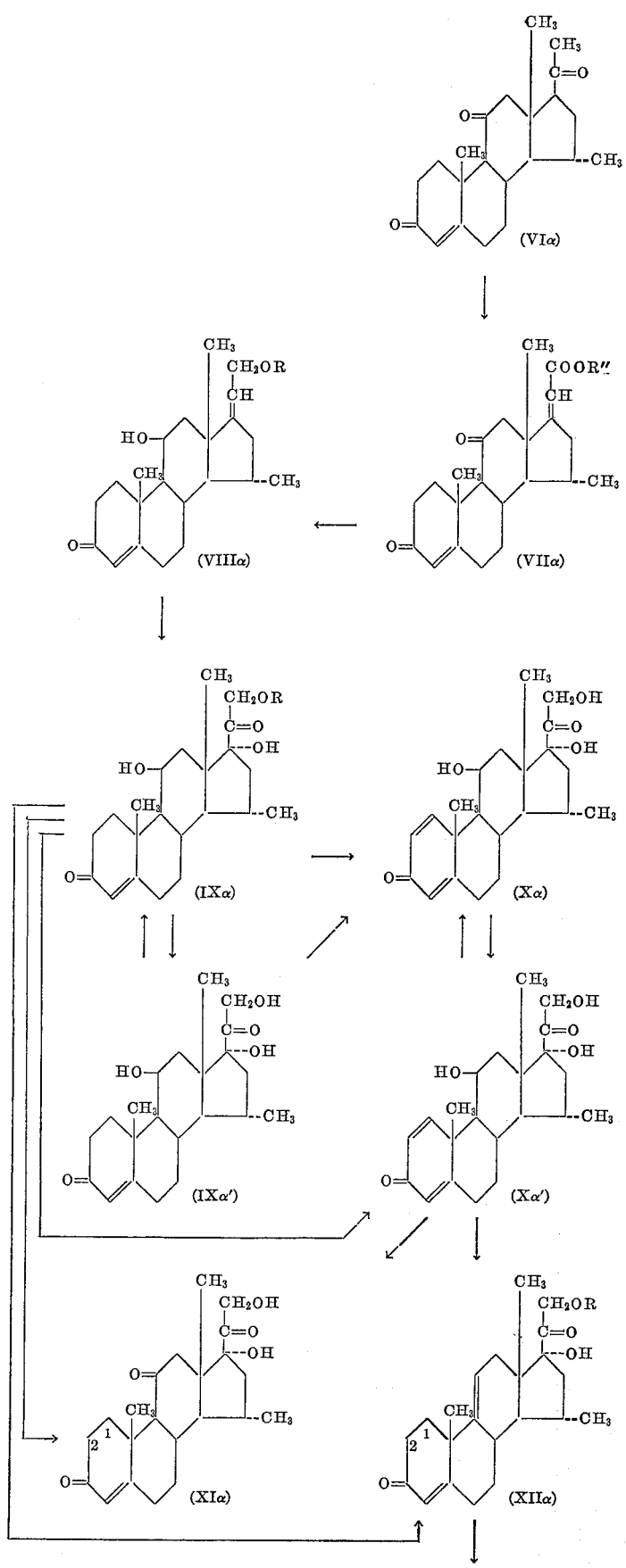

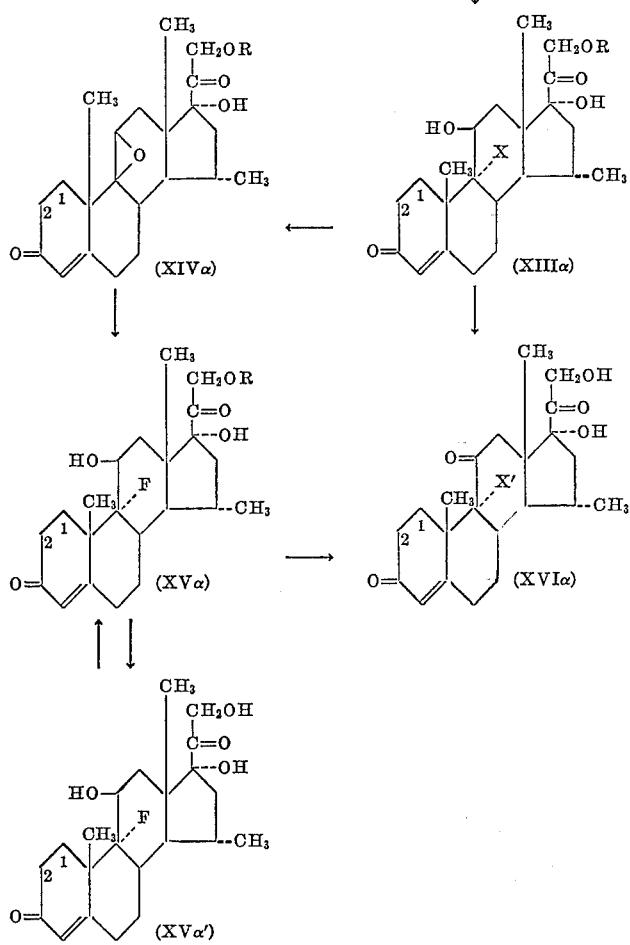

wherein the symbol

represents an alkylene ketal radical of the formula

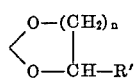

wherein n is selected from the integers one and two and R' is selected from the group consisting of hydrogen and a lower-alkyl radical containing from 1 to 6 carbon atoms, inclusive; R is the acyl radical of a hydrocarbon carboxylic acid containing from 1 to 12 carbon atoms, inclusive; R" is lower-alkyl, i.e., containing from 1 to 8 carbon atoms, inclusive, preferably methyl or ethyl; X is a halogen having an atomic weight from 35 to 127, inclusive, i.e., chlorine, bromine or iodine; X' is a halogen having an atomic weight from 19 to 127, i.e., fluorine, chlorine, bromine or iodine; the 1,2-linkage is selected from the group consisting of single bonds and doube bonds.

The novel compounds of this invention and the intermediates therefor possess valuable pharmacological properties, particularly central nervous system depressing, sedative, anesthetic, tranquilizing, smooth muscle inhibiting, progestational, anti-fertility, salt regulating and anti-inflammatory activities of improved therapeutic ratio, i.e., with decreased relative degree of unfavorable corticoid side effects such as weight loss, sodium retention, ulcer formation, calcium loss, adrenal and pituitary inhibition and the like, present in certain similar known physio- logically active steroids. The compounds of this invention have the formulae:

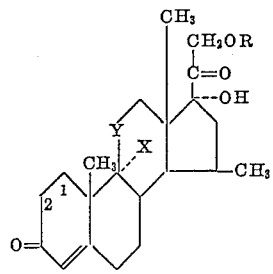

and

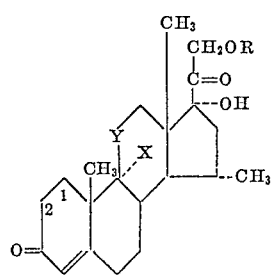

wherein the 1,2-carbon linkage is selected from the group consisting of single bonds and double bonds; X is selected from the group consisting of hydrogen and fluorine; Y is selected from the group consisting of the β-hydroxymethylene radical,

and the carbonyl radical, >C=O; R is selected from the group consisting of hydrogen and the acyl radical of a hydrocarbon carboxylic acid containing from one to twelve carbon atoms, inclusive. The anti-inflammatory activity of the compounds of the above formulae render them useful in the treatment of various inflammatory conditions of the skin, eyes, respiratory tract, bones and internal organs due to bacterial or viral infections, contact dermatitis, allergic reactions and rheumatoid arthritis.

The compounds of the present invention can be prepared and administered to mammals, birds and animals in a wide variety of oral and parenteral dosage forms, singly, or in admixture with other coacting compounds. They can be associated with a carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

The novel 15β- and 15α-methyl compounds of the present invention are both prepared from 15α-methyl-15β-hydroxy-4-pregnene-3,11,20-trione 3,20-bis(alkylene ketal) (I), which is in turn prepared from the known 4-pregnene-3,11,15,20-tetraone 3,20-bis(alkylene ketals).

The novel 15β-methyl compounds are prepared from 15α-methyl-15β-hydroxy-4-pregnene-3,11,20-trione 3,20-bis(alkylene ketal) (I) by the following reactions: the 3- and 20-ketal groups of the compounds represented by Formula I are removed by hydrolysis with an acid to obtain 15α-methyl-15β-hydroxy-4-pregnene-3,11,20-trione (II).

The next step of the process of this invention involves the saturation of the 4(5)-double bond of 15α-methyl-15β-hydroxy-4-pregnene-3,11,20-trione (II) by catalytic hydrogenation, e.g., with hydrogen in the presence of palladium on calcium carbonate at moderate or atmospheric pressure, to give 15β-hydroxy-15α-methyl-5β-pregnane-3,11,20-trione (III).

In the next step of the process the 3- and 20-keto groups of 15β-hydroxy-15α-methyl-5β-pregnane-3,11,20-trione (III) are ketalized preferably with ethylene glycol and p-toluenesulfonic acid to yield 15β-hydroxy-15α-methyl-5β-pregnane-3,11,20-trione 3,20-bis(alkylene ketal) (IV). The thus produced diketal (IV) is selectively dehydrated at the 15-position, e.g., by dissolving in pyridine and reacting with thionyl chloride to give 15β-methyl-14-dehydro-5β-pregnane-3,11,20-trione 3,20-bis(alkylene ketal) (V). Hydrolysis of the 3- and 20- ketals of the compounds of Formula V, e.g., at room temperature under mildly acidic conditions, yields 15-methyl-14-dehydro-5β-pregnane-3,11,20-trione (VIII).

15-methyl-14-dehydro-5β-pregnane-3,11,20-trione (VIII) can also be produced by two other routes. (1) By dehydrating 15α-methyl-15β-hydroxy-4-pregnene-3,11,20-trione (II), preferably with an N-haloamide in pyridine, to yield 15-methyl-4,14-pregnadiene-3,11,20-trione (VII), and saturating the 4(5)-double bond of the thus produced compound (VII), e.g., by hydrogenation with palladium catalyst, to give 15-methyl-14-dehydro-5β-pregnane-3,11,20-trione (VIII). (2) By dehydration of 15α-methyl-15β-hydroxy-4-pregnene-3,11,20-trione 3,20-bis(alkylene ketal) (I), e.g., by dissolving in pyridine and reacting with thionyl chloride, to yield 15-methyl-4,14-pregnadiene-3,11,20-trione 3,20-bis(alkylene ketal) (VI), followed by hydrolysis of the thus produced compounds (VI), e.g., at room temperature under mildly acidic conditions, to give 15-methyl-4,14-pregnadiene-3,11,20-trione (VII). Saturation of the 4(5)-double bond of the compound of Formula VII is brought about by catalytic hydrogenation, e.g., in the presence of palladium or Raney nickel (if Raney nickel is used) followed by reoxidation of the 3β-OH intermediate formed during the hydrogenation, by reacting said intermediate with a solution of chromic acid in water and acetone, according to the method of Djerassi et al., J. Org. Chem. 21, 1547 [1956], to yield 15-methyl-14-dehydro-5β-pregnane-3,11,20-trione (VIII).

The next step of the process of this invention is the hydrogenation of the 14(15)-double bond of the compound of Formula VIII, e.g., in the presence of platinum oxide catalyst in a solvent medium, to yield 15β-methyl-5β-pregnane-3,11,20-trione (IX).

In the next step of the process the compound of Formula IX is dehydrogenated at the 4(5)-position by conventional methods well known in the steroid art, e.g., by reaction with t-butyl hypochlorite and strong acid followed by treating the resulting product with an acid salt of semicarbazide, an alkali metal acetate and a keto-acid such as pyruvic acid, to yield 15β-methyl-4-pregnene-3,11,20-trione (X). The compound of Formula X can also be prepared from 15α-methyl-15β-hydroxy-4-pregnene-3,11,20-trione 3,20-bis(alkylene ketal) (I) by reacting said compound with dimethyl carbonate to give a 15α-methyl-15β-hydroxy-4-pregnene-3,11,20-trione, 3,20-bis(alkylene ketal), 15-methyl carbonate (IIα); heating the thus produced compound (IIα) (preferably under vaccum) yields a 15-methyl-4,15-pregnadiene-3,11,20-trione 3,20-bis(alkylene ketal) (IIIα). Reduction of a compound embraced by Formula IIIα, e.g., by hydrogenation in the presence of platinum oxide catalyst, yields a 15β-methyl-4-pregnene-3,11,20-trione 3,20-bis(alkylene ketal), which on hydrolysis gives 15β-methyl-4-pregnene-3,11,20-trione (X). The compound of Formula X can also be prepared by reduction of the known 4-pregnene-3,11,15,20-tetraone 3,20-bis(alkylene ketal), e.g., with methyl triphenylphosphonium bromide and n-butyl lithium, to yield 15-methylene-4-pregnene-3,11,20-trione 3,20-bis(alkylene ketal). Hydrogenation of the thus produced 15-methylene compound, e.g., with platinum catalyst, yields the corresponding 15β-methyl-4-pregnene-3,11,20-trione 3,20-bis(alkylene ketal) with a minor amount of the corresponding 15α-isomer. Separation of the isomers is readily accomplished by chromatography. Hydrolysis of the major (β) component gives 15β-methyl-4-pregnene-3,11,20-trione (X).

In the next step of the process of this invention, the compound of Formula X is converted to a lower alkyl-15β - methyl - 3,11 - diketo - 4,17(20) - pregnadien - 21-oate (XI) according to the method of U.S. Patent 2,790,814.

The next step of the process of the present invention is a reduction step in which the thus produced lower alkyl 15β - methyl - 3,11 - diketo - 4,17(20) - pregnadien - 21-oate (XI) is reduced with lithium aluminum hydride in the manner disclosed in U.S. Patent 2,781,343 or other chemical carboxyl reducing agent in an organic solvent to yield 15β-methyl-11β,21-dihydroxy-4,17(20)-pregnadien-3-one (XII). At completion of this reaction, the reaction mixture is preferably mixed with water or, an acid, an ester or carbonyl agent followed by water, to decompose any excess lithium aluminum hydride and organometallic complexes. The usual reaction conditions for a lithium hydride reduction are employed, except that a reaction temperature at room temperature or below is preferred.

The next step is an esterification reaction involving the conversion of the 21-hydroxy group of 15β-methyl-11β,21-dihydroxy-4,17(20)-pregnadien-3-one (XII) to a 21-acyloxy group so as to protect the 21-hydroxy group in the next step, i.e., the oxidative hydroxylation. This reaction can be performed under the esterification conditions known in the art, e.g., by the reaction of (XII) with the selected acid halide or the anhydride of a hydrocarbon carboxylic acid, or by reaction with the selected acid, in the presence of an esterification catalyst or with an ester exchange reaction conditions, to give 15β-methyl-11β,21-dihydroxy-4,17(20)-pregnadien-3-one 21-acylate (XIII).

In the next step of the process of this invention, the thus produced ester (XIII) is oxidatively hydroxylated with osmium tetroxide and an oxidizing agent, e.g., hydrogen peroxide, an organic peracid, an amine oxide peroxide, or an aryl iodo oxide, in the manner described in U.S. Patents 2,769,825, 2,769,823 or in Hogg et al., J. Am. Chem. Soc., 77, 4436 (1955) to produce the corresponding 15β-methyl-11β,17α,21-trihydroxy-4-pregnene-3,20-dione 21-acylate (XIV). Hydrolysis of this compound (XIV) by alkali, preferably in a nitrogen atmosphere, produces the free triol, 15β-methyl-11β,17α,21-trihydroxy-4-pregnene-3,20-dione (XIV′). Esterification of the triol (XIV′) with halides and anhydrides of organic carboxylic acids or organic carboxylic acids containing from one to eight carbon atoms gives 15β-methyl-11β,17α,21-trihydroxy - 4 - pregnene - 3,20 - dione 21-acylate (XIV).

15β - methyl - 11β,17α,21 - trihydroxy-4-pregnene-3,20-dione (XIV′) or its 21-acylate (XIV), preferably the 21-acetate, can be converted to numerous physiologically active steroids. For example, it can be dehydrogenated in the one position with selenium dioxide or a fungus capable of dehydrogenating at the one position without otherwise degrading the nucleus, e.g., of the genus Septomyxa, to produce 15β-methyl-11β,17α,21-trihydroxy-1,4-pregnadiene-3,20-dione (XV). This compound can in turn be esterified to produce its esters (XV′) according to methods known in the art.

15β - methyl - 11β,17α,21 - trihydroxy-4-pregnene-3,20-dione 21-acylate (XIV) and 15β-methyl-11β,17α,21-trihydroxy-1,4-pregnadiene-3,20-dione 21-acylate (XV′) can be oxidized with a N-haloamide or N-haloimide, e.g., N-bromoacetamide in pyridine or like amine, or with chromic acid or sodium dichromate, according to methods known in the art, to produce the corresponding 11-keto compounds (XVI), which in turn can be hydrolyzed in the manner described herein to produce the corresponding 21-hydroxy compounds.

The 9α-halo compounds of the present invention can be prepared as follows: dehydrating a 15β-methyl-11β,17α,21-trihydroxy-4-pregnene - 3,20 - dione 21 - acylate (XIV) or a 15β-methyl-11β,17α,21-trihydroxy-1,4-pregnadiene-3,20-dione 21-acylate (XV′), illustratively with sulfuric acid or preferably with an N-haloamide followed by anhydrous sulfur dioxide, produces 15β-methyl-17α,21-dihydroxy-1,4,9(11)-pregnatriene-3,20-dione 21-acylate (XVII) and 15β-methyl-17α,21-dihydroxy-4,9(11)-pregnadiene-3,20-dione 21-acylate (XVII), respectively. Addition of a hypohalous acid, i.e., hypochlorous, hypoiodous or hypobromous acid, to these compounds of Formula XVII produces the corresponding- 9α-halo-15β-methyl - 11β,17α,21 - trihydroxy - 1,4 - pregnadiene-3,20-dione 21-acylate (XVIII) and 9α-halo-15β-methyl-11β, 17α, 21-trihydroxy-4-pregnene - 3,20 - dione 21-acylate (XVIII), respectively. Treatment of the thus produced 9α-halo compounds (XVIII) with a base, e.g., anhydrous potassium acetate, yields the corresponding epoxy compounds, 15β-methyl-9β,11β-epoxy-17α, 21-dihydroxy-1,4-pregnadiene-3,20-dione 21-acylate (XIX) and 15β-methyl-9β,11β-epoxy-17α,21-dihydroxy-4 - pregnene-3,20-dione 21-acylate (XIX), respectively. Treatment of these epoxy compounds (XIX) with hydrogen fluoride or other hydrogen fluoride releasing agents produces 9α-fluoro-15β-methyl - 11β,17α,21 - trihydroxy-1,4-pregnadiene-3,20-dione 21-acylate (XX) and 9α-fluoro-15β-methyl-11β,17α,21-trihydroxy-4-pregnene-3,20 - dione 21-acylate (XX), respectively. Oxidation of the compounds of Formula XX, preferably the 21-acetate, with chromic acid in acetic acid provides 9α-fluoro-15β-methyl-17α,21-dihydroxy-1,4-pregnadiene - 3,11,20 - trione 21-acylate (XXI) and 9α-fluoro-15β-methyl-17α,21 - dihydroxy - 4-pregnene - 3,11,20 - trione 21-acylate (XXI) respectively. Hydrolysis of the esters represented by Formula XXI with a base, e.g., aqueous sodium hydroxide or sodium bicarbonate, provides the free alcohols 9α-fluoro-15β-methyl-17α,21-dihydroxy - 1,4-pregnadiene-3,11,20-trione and 9 - fluoro - 15β - methyl - 17,21 - dihydroxy-4-pregnene-3,11,20-trione, respectively. The esters, represented by Formula XX are similarly hydrolyzed to the corresponding 21-hydroxy compounds (XX′). Esterification of the triols (XX′) with halides and anhydrides of organic carboxylic acids or organic carboxylic acids containing from one to eight carbon atoms gives 9α-fluoro-15β-methyl - 11β,17α,21-trihydroxy - 1,4 - pregnadiene-3,20-dione 21-acylate (XX) and 9α-fluoro-15β-methyl-11β,17α,21-trihydroxy - 4 - pregnene - 3,20-dione 21-acylate (XX), respectively.

The novel 15α-methyl compounds of this invention are prepared from a 15α-methyl-15β-hydroxy-4-pregnene-3, 11,20-trione 3,20-bis(alkylene ketal) (I) by the following reactions: A compond of Formula I is treated with dimethyl carbonate to give a 15α-methyl-15β-hydroxy-4-pregnene-3,11,20-trione 3,20-bis(alkylene ketal), 15-methyl carbonate (IIα); heating the thus produced compound (IIα) (preferably under vacuum) yields a 15-methyl-4,15-pregnadiene-3,11,20-trione 3,20-bis(alkylene ketal) (IIIα). [A 15β-methyl compound (X) can be produced at this stage of the 15α-methyl process by reduction of a compound of Formula IIIα, e.g., by hydrogenation in the presence of platinum oxide catalyst, to yield a 15β-methyl-4-pregnene-3,11,20-trione 3,20-bis(alkylene ketal), which on hydrolysis gives 15β-methyl-4-pregnene-3,11,20-trione (X).]

A 15-methyl-4,15-pregnadiene-3,11,20-trione 3,20-bis (alkylene ketal) (IIIα) is hydrolyzed, e.g., at room temperature under mildly acidic conditions, to yield a 15-methyl-4,15-pregnadiene-13,11,20-trione 3-alkylene ketal (IVα). A compound of Formula IVα is dissolved in alkanolic potassium hydroxide to effect its isomerization to a 15α-methyl-4,16-pregnadiene-3,11,20-trione 3-alkylene ketal, and the resulting Δ¹⁶-compound then reduced, e.g., with hydrogen in the presence of a palladium catalyst, to yield a 15α-methyl-4-pregnene-3,11,20-trione 3-alkylene ketal (Vα).

The next step of this process involves the simultaneous production of both 15α-methyl-4-pregnene-3,11,20-trione (VIα) and 15α-methyl-11-keto - 17(α) - isoprogesterone (VIα′) by the acid hydrolysis at elevated temperatures of a 15α-methyl-4-pregnene-3,11,20-trione 3-alkylene ketal (Vα). The 17(α)-iso material (VIα′) can be converted to 15α-methyl-4-pregnene-3,11,20-trione (VIα) by being dissolved in a solvent such as acetone, treated with a mineral acid and purified and isolated by chromatography.

15α-methyl-4-pregnene-3,11,20-trione (VIα) can be converted to the compounds of Formulae VIIα, VIIIα, IXα, IXα′, Xα, Xα′, XIα, XIIα, XIIIα, XIVα, XVα, XVα′ and XVIα by following the procedures disclosed above for the preparation of the 15β-methyl counterparts thereof represented by Formulae XI, XII, XIII, XIV, XIV′, XV, XV′, XVII, XVIII, XIX, XX, XX′ and XXI from 15β-methyl-4-pregnene-3,11,20-trione (X).

PREPARATION 1

*15α-Hydroxy-11-Ketoprogesterone*

A medium was prepared of ten grams Cerelose (dextrose), 20 grams of corn steep liquor and 1000 milliliters of water and adjuster to a pH between 5.5 and 6. Twelve liters of this sterilized medium was inoculated with spores of *Penicillium urticae* ATCC 10120 and incubated for a period of 24 hours at a temperature of 26 degrees centigrade, using a rate of aeration and stirring such that the oxygen up-take was 13 millimoles per hour per liter of $Na_2SO_3$, according to the method of Cooper Fernstrom and Miller, Ind. Eng. Chem. 36, 504 (1944). To this medium containing a 24 hour growth of *Penicillium urticae* was added 2 grams of 11-ketoprogesterone, dissolved in 100 milliliters of acetone. After an additional 24 hour period of incubation under the same conditions of temperature and aeration, the beer and mycelium were separated. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts, including solvent, were added to the beer filtrate and the combined extracts and beer filtrates were extracted successively with two one-half by volume portions of methylene chloride and then with two one-fourth portions of methylene chloride. The methylene chloride extracts were washed with two one-tenth by volume portions of a 2% aqueous solution of sodium bicarbonate and then with two one-tenth by volume portions of water. After drying the methylene chloride extracts with about 3 to 5 grams of anhydrous sodium sulfate per liter of solvent and filtering, the solvent was distilled from the filtrate. The residue thus obtained was recrystallized two times from acetone and ether in 1 to 1 ratio and one time from acetone and Skellysolve B to give 15α-hydroxy-11-ketoprogesterone of melting point 227–229° and rotation +257° (in EtOH).

PREPARATION 2

*15α-Hydroxy-4-Pregnene-3,11,20 - Trione 3,20 - Bis(Ethylene Ketal) [15α-Hydroxy-11-Keto-Progesterone 3,20-Bis(Ethylene Ketal)]*

A mixture of 4.75 grams of 15α-hydroxy-11-ketoprogesterone (Preparation 1), 100 milliliters of benzene, 5 milliliters of ethylene glycol and 0.1 gram of para-toluenesulfonic acid was refluxed with stirring under a water trap for six hours. The mixture was then cooled and the product crystallized. The acid was neutralized by the addition of 10 milliliters of saturated sodium bicarbonate solution and the mixture stirred for fifteen minutes. The crystalline precipitate was removed by filtration and oven-dried. The product was recrystallized from acetone containing a drop of pyridine, to yield 2 grams of crystals melting at 248–250°. A second crop furnished 0.80 gram. The original filtrate was evaporated, the residue and also the second crop were recrystallized to yield an additional 1.12 grams of 15α-hydroxy-4-pregnene-3,11,20-trione 3,20-bis(ethylene ketal), melting at 246–248 degrees centigade.

*Analysis.*—Calcd. for $C_{25}H_{36}O_6$: C, 69.42; H, 8.59. Found: C, 69.41; H, 8.42. $[\alpha]_D$ +62° (acetone);

$\gamma_{max.}^{Nujol}$ 3530, 1697, 1100 cm.$^{-1}$

PREPARATION 3

*4 - Pregene-3,11,15,20-Tetraone 3,20-Bis(Ethylene Ketal) (11,15-Diketoprogesterone 3,20-Bis[Ethylene Ketal])*

A solution of 5.0 grams of 15α-hydroxy-11-ketoprogesterone 3,20-bis(ethylene ketal) (Preparation 2) in 50 milliliters of pyridine was added to a solution of 5.0 grams of chromium trioxide in 50 milliliters of pyridine. The reaction mixture was allowed to stand overnight. The mixture was diluted with 300 milliliters of water and extracted with methylene chloride. The solvent was removed in vacuo and the product recrystallized from a mixture of acetone and Skellysolve B(hexanes) to give 2.6 grams of 4 - pregnene-3,11,15,20-tetraone-3,20-bis(ethylene ketal) of melting point 198°–206°. A sample was twice more recrystallized to give pure 4-pregnene-3,11,15,20-tetraone 3,20-bis(ethylene ketal) with melting point 208°–210° and rotation $[\alpha]_D$ —16 degrees (acetone).

PREPARATION 4

*15α-Methyl-15β-Hydroxy - 4 - Pregnene-3-11,20-Trione 3,20-Bis(Ethylene Ketal) (15α-Methyl-15β-Hydroxy-11-Ketoprogesterone 3,20-Bis[Ethylene Ketal]) (I)*

A solution was prepared containing 1.15 grams of 4-pregene - 3,11,15,20-tetraone 3,20 - bis(ethylene ketal) (Preparation 3) in 50 milliliters of tetrahydrofuran. This solution was cooled in an ice bath and thereto was added 20 milliliters of a commercial three-molar methyl magnesium bromide solution in ether. The ice bath was removed and the reaction stirred at room temperature for five hours. The reaction mixture was then decomposed by the addition of a saturated ammonium chloride solution. The liquid was decanted from the solids and filtered. The solids were washed with methylene chloride. The methylene chloride washings were added to the filtrate and the filtrate was allowed to evaporate yielding 1.07 grams of material which was recrystallized from acetone Skellysolve B hexanes to give 15α-methyl-15β-hydroxy-4-pregnene-3-,11,20-trione 3,20-bis(ethylene ketal) (I) of melting point 206–210 degrees centrigade.

*Analysis.*—Calcd. for $C_{26}H_{38}O_6$: C, 69.93; H, 8.58 Found: C, 69.97; H, 8.86. $[\alpha]_D$ (acetone) +15°;

$\gamma_{max.}^{Nujol}$ 3540, 3400, 1695, 1670, 1163, 1095, 1025 cm.$^{-1}$

PREPARATION 5

*15α-Methyl-15β-Hydroxy-4-Pregnene-3,11,20-Trione 3,20-Bis(Ethylene Ketal), 15-Methyl Carbonate ester (15-Hydroxy-11-Ketoprogesterone 3,20-Bis[Ethylene Ketal], 15-Methylcarbonate ester) (IIα)*

A mixture of 12 g. (28.4 millimoles) of 15α-methyl-15β-hydroxy-4-pregnene-3,11,20-trione 3,20 - bis(ethylene ketal) (I) (Preparation 4), 240 ml. of dimethyl carbonate and 430 ml. of benzene was placed in a flask equipped with a Dean-Stark water trap. The mixture was stirred and heated at refluxing temperature on a steam bath for about 15 minutes. The flask was provided with a nitrogen atmosphere, 14 g. of a 52% dispersion of sodium hydride in mineral oil was added cautiously and the reaction mixture stirred while heating at refluxing temperature for a period of about 24 hours. The reaction mixture was filtered through a Celite pad; the residual sodium hydride was carefully decomposed with tertiary butyl alcohol. The filtrate was concentrated by vacuum distillation with heat generated by a hot water bath kept at 60° C. to yield a gummy crystalline mass. The total crude product was dissolved in 500 ml. of methylene chloride and chromatographed over 800 g. of Florisil (synthetic magnesium silicate). The first four 500 ml. fractions of 10% acetone in Skellysolve B removed mineral oil and traces of less polar impurities; the product was eluted in fractions 6 to 9, inclusive, with 15% acetone in Skellysolve B and on recrystallization from methanol yielded 11.2 g. (22.2 millimoles or 78.3% of theoretical) of pure 15α-methyl-15β-hydroxy-4-pregnene-3,11,20-trione 3,20 - bis(ethylene ketal), 15-methylcarbonate ester (IIα) with a melting point of 164 to 166° C. and a rotation $[\alpha]_D$ of +12° (chloroform).

*Analysis.*—Calcd. for $C_{28}H_{40}O_8$: C, 66.70; H, 8.0. Found: C, 66.79; H, 8.07.

PREPARATION 6

*15-Methyl-4,15-Pregnadiene - 3,11,20 - Trione 3,20-Bis(Ethylene Ketal) (15 - Dehydro - 15 - Methyl-11-Ketoprogesterone 3,20-Bis[Ethylene Ketal]) (IIIα)*

A 200 ml. flask containing 10 g. of 15α-methyl-15β-hydroxy-4-pregnene - 3,11,20 - trione - 3,20 - bis(ethylene ketal), 15-methylcarbonate ester (IIα) was evacuated and then placed in a Wood's metal bath having a temperature of about 230° C. The steroidal material was heated with stirring for about 5 minutes while the bath temperature rose to 260° C. and the molten mass bubbled vigorously as the carbonate ester was pyrolyzed. The flask was removed from the bath, cooled and the glassy contents dissolved in 100 ml. of methanol; crystallization occurred almost immediately following solution. After cooling, the mixture was filtered and gave 7.48 g. of crystalline 15-methyl - 4,15 - pregnadiene-3,11,20-trione-3,20-bis(ethylene ketal) (IIIα) with a melting point of 127 to 133° C. and a rotation $[\alpha]_D$ of +42° (chloroform).

EXAMPLE 1

*15α-Methyl-15β-Hydroxy - 4 - Pregnene - 3,11,20 - Trione (15α-Methyl-15β-Hydroxy-11-Ketoprogesterone) (II)*

A warm solution of 15α-methyl-15β-hydroxy-11-ketoprogesterone, 3,20-bis ethylene glycol ketal (I) (10.4 g.) (synthesized in the manner of Preparation 4) in acetone (200 ml.) was treated with water (20 ml.) containing concentrated sulfuric acid (25 drops) and allowed to stand at room temperature. After a few minutes a solid crystallized out. The mixture was again warmed on a steam bath but solution did not occur. The solid was removed by filtration and the filtrate allowed to stand overnight. The mixture was neutralized with saturated sodium bicarbonate and the solvent removed in vacuo. During solvent removal, the product crystallized. Distillation was stopped and the product removed by filtration. After oven drying, the product (6.5 g.) melted at 235 to 248° C. An analytical sample of this compound, 15α-methyl-15β-hydroxy-4-pregnene-3,11,20-trione (II), twice recrystallized from acetone, melted at 247 to 250° C.

*Analysis.*—Calcd. for $C_{23}H_{30}O_4$: C, 73.71; H, 8.48. Found: C, 73.90; H, 8.48.

$\gamma_{Nujol}^{max.}$ OH, 3420 cm.$^{-1}$; C=O, 1705, 1685 cm.$^{-1}$; conj. C=O, 1660 cm.$^{-1}$; C=C 1615 cm.$^{-1}$

EXAMPLE 2

*15-Methyl-4,14-Pregnadiene-3,11,20-Trione (15-Methyl-14-Dehydro-11-Ketoprogesterone) (VII)*

A mixture of 15β-hydroxy-15α-methyl-11-ketoprogesterone (II) (1.00 g.), N-bromoacetamide (0.5 g.) and pyridine (5 ml.) was stirred for about ten minutes at room temperature and then cooled in an ice bath. A saturated solution of sulfur dioxide-pyridine was added dropwise until the color changed to orange and then back to colorless. The mixture was stirred an additional ten minutes and then poured onto ice. The product was extracted with methylene chloride, the extracts washed with dilute hydrochloric acid and reduced to dryness under vacuum to yield a crystalline residue. Oily crystals were obtained upon recrystallization of this residue from acetone-Skellysolve B. Recrystallization of this compound from aqueous methanol yielded crystals (0.27 g.) of the desired compound, 15 - methyl-4,14-pregnadiene-3,11,20-trione (VII), melting at 146 to 147° C.

*Analysis.*—Calcd. for $C_{22}H_{28}O_3$: C, 77.61; H, 8.27. Found: C, 77.32; H, 7.80.

$\gamma_{Nujol}^{max.}$ C—O, 1702 cm.$^{-1}$; conj. C—O, 1660 cm.$^{-1}$; C—C, 1623 cm.$^{-1}$

EXAMPLE 3

*15 - Methyl - 4,14 - Pregnadiene-3,11,20-Trione 3,20-Bis-(Ethylene Ketal) (15 - Methyl-14-Dehydro-11-Keto-Progesterone 3,20-Bis[Ethylene Ketal]) (VI)*

A solution of 15β-hydroxy-15-methyl-11-ketoprogesterone, 3,20-bis ethylene glycol ketal (I) (1.00 g.) in pyridine (10 ml.) was cooled to 0° C. and thionyl chloride (0.8 ml.) added. The mixture was stirred in the ice bath for about 10 minutes and then poured onto ice. The product crystallized and was removed by filtration when the ice melted. This product (0.85 g.) was recrystallized from aqueous methanol to yield crystals (0.75 g.) melting at 133 to 134° C. of 15-methyl-4,14-pregnadiene-3,11,20-trione 3,20-bis(ethylene ketal) (VI).

*Analysis.*—Calcd. for $C_{26}H_{36}O_5$: C, 72.86; H, 8.48. Found: C, 73.17; H, 8.68.

$\gamma_{max.}^{Nujol}$ 1701, 1675, 1658, 1150–1035 cm.$^{-1}$

EXAMPLE 4

*15 - Methyl-4,14-Pregnadiene-3,11,20-Trione (15-Methyl-14-Dehydro-11-Ketoprogesterone) (VII)*

A solution of 15-methyl-14-dehydro-11-ketoprogesterone, 3,20-bis ethylene glycol ketal (VI) (11.39 g.), acetone (250 ml.) and water (25 ml.) containing concentrated sulfuric acid (25 drops) under nitrogen was allowed to stand overnight. The mixture was neutralized with saturated sodium bicarbonate and the acetone was removed therefrom in vacuo. The residue was extracted with methylene chloride, the solvent removed and the product chromatographed over Florisil (1 kg.) and eluted with 10 and 15% portions of acetone in Skellysolve B. The product (5.94 g.) was eluted with 15% acetone-Skellysolve B fractions. A sample of the crystalline chromatographic fractions melted at 128–134° C. and was identified as 15-methyl-4,14-pregnadiene-3,11,20-trione (VII). The infrared absorption of this sample was identical to the 15-methyl-14-dehydro-11-ketoprogesterone previously prepared by the N-bromoacetamide-sulfur dioxide-pyridine dehydration of 15β-hydroxy-15-methyl-11-ketoprogesterone (II) of Example 2.

EXAMPLE 5

*15 - Methyl-5β-Pregn-14-Ene-3,11,20-Trione (15-Methyl-14-Dehydro-5β-Pregnane-3,11,20-Trione) (VIII)*

A mixture of 15-methyl-14-dehydro-11-ketoprogesterone (VII) (4.07 g.), methanol (200 ml.), 5% palladium on cadmium carbonate (2.0 g.) was reduced with hydrogen in a Parr shaker for one hour. A 10 lb. pressure drop occurred. The reduction was stopped, the catalyst removed by filtration through Celite (diatomaceous earth) and the solvent removed by evaporation. The infrared spectrum of the residue indicated that about 60% of the $\Delta^4$ double bond remained. The residue was dissolved in methanol (150 ml.) and refluxed for 75 minutes with about 10 g. of Raney nickel. The Raney nickel was removed by filtration through Celite moistened with methanol. The reaction solvent was made up to 200 ml. with methanol and 5% palladium on cadmium carbonate (2.0 g.) was added. The mixture was reduced for three hours on the Parr shaker. A 5.5 lb. pressure drop occurred. An additional portion of catalyst (2.0 g.) was added and the mixture shaken overnight. Another 5.5 lb. pressure drop occurred. The catalyst was removed by filtration and the solvent removed. The product was chromatographed over Florisil (synthetic magnesium silicate) (300 g.) and eluted with 5-10-15-20% portions of acetone-Skellysolve B. A partially crystalline product (3.612 g.) was eluted with the 15% and first of the 20% eluates. The infrared spectrum of this product showed hydroxyl absorption. The product was dissolved in acetone (100 ml.), cooled to 0° C., and a reagent comprising a solution of chromic acid, water, acetone, and sulfuric acid (5.0 ml.) added [see Djerassi et al., J. Org. Chem. 21, 1547 (1956)]. The reaction mixture was stirred for 15 minutes. The mixture was poured into water and extracted with methylene chloride. The extracts were washed with saturated sodium bicarbonate, the solvent removed, and the product chromatographed over a column of Florisil and eluted with acetone in Skellysolve B. Fractions 11 to 13 were eluted from the column with 10% acetone in Skellysolve B to yield a substance (0.82 g.), which on recrystallization from the same pair of solvents gave crystals (0.35 g.) melting at 105 to 107° C. Fractions 4 to 10 were eluted from the Florisil column with 8% acetone in Skellysolve B and contained the desired product (1.942 g.); this material was recrystallized from acetone-Skellysolve B and gave crystals (1.03 g.) melting at 129 to 134° C. A second recrystallization from the same solvents yielded crystals (0.79 g.) of pure 15-methyl-14-dehydro-5β-pregnane-3,11,20-trione (VIII) with a melting point of 150 to 152° C.

*Analysis.*—Calcd. for $C_{22}H_{30}O_3$: C, 77.15; H, 8.83. Found: C, 77.06; H, 8.92.

$\gamma_{max.}^{Nujol}$ 1700, 1660 cm.$^{-1}$. $[\alpha]_D$ (acetone) 120°.

EXAMPLE 6

*15β-Methyl-5β-Pregnane-3,11,20-Trione (IX)*

A mixture of 15-methyl-14-dehydro-5β-pregnane-3,11,20-trione (VIII) (0.65 g.), platinum oxide (0.65 g.), and glacial acetic acid (200 ml.) was shaken on a Parr hydrogenator overnight. A pressure drop of 22 lb. occurred. The reduction was stopped, the catalyst removed by filtration and the solvent removed under reduced pressure. The crystalline residue when tested for the presence of double bonds (with tetranitromethane) was negative.

The residue was redissolved in glacial acetic acid (15 ml.) sodium dichromate (1.5 g.) added and the mixture stirred for about one hour at room temperature. The mixture was poured into water (200 ml.) and extracted three times with methylene chloride. The combined extracts were washed with saturated sodium bicarbonate solution and the solvent removed under reduced pressure. The oily residue crystallized upon addition of ether. The product, 15β-methyl-5β-pregnane-3,11,20-trione (IX), was recrystallized from ether yielding a first crop (0.20 g.) melting at 144 to 146° C. A second crop (0.11 g.) melted at 144 to 147° C.

*Analysis.*—Calcd. for $C_{22}H_{32}O_3$: C, 76.70; H, 9.36. Found: C, 77.09; H, 9.46.

$\gamma_{max.}^{Nujol}$ 1700, 1180 cm.$^{-1}$

The rotatory dispersion curve of this compound is identical to that of the 15β-methyl-5β-pregnane-3,11,20-trione prepared in Example 7C.

EXAMPLE 7

A. *15β-Methyl-5β-Pregnane-11,20-Dione*
B. *15β-Methyl-5β-Pregnane-3,20-Dione*
C. *15β-Methyl-5β-Pregnane-3,11,20-Trione*
D. *15β-Methyl-5α-Pregnane-3,11,20-Trione*

A mixture of 15-methyl-14-dehydro-11-ketoprogesterone (VII) (5.93 g.), 5% palladium on cadmium carbonate (2.0 g.) and absolute ethanol (200 ml.) was reduced with hydrogen on a Parr shaker for about 110 minutes. A pressure drop of 24 lbs. occurred. The reduction was stopped and the catalyst removed by filtration. The solvent was removed under reduced pressure and the crystalline residue [15-methyl-14-dehydro-5β-pregnane-3,11,20-trione (VIII)] redissolved in glacial acetic acid (200 ml.) and platinum oxide (3.0 g.) added. The mixture was reduced on a Parr shaker overnight. A total of 107 lbs. of pressure drop occurred. The reduction was stopped, the catalyst removed by filtration, the solvent removed under reduced pressure; the syrupy residue was redissolved in glacial acetic acid (100 ml.) and sodium dichromate (15 g.) added. The mixture was allowed to stir at room temperature for about 50 minutes. The mixture was poured into water (400 ml.) and extracted three times with methylene chloride. The combined extracts were washed with water and then with saturated sodium bicarbonate solution. The solvent was removed under reduced pressure and the product was chromatographed on Florisil (500 g.) and eluted with increasing proportions of acetone and Skellysolve B. The 5–10% eluates contained two separated crystalline fractions—A and B.

A. 1.407 g. of crude crystalline product on recrystallization from Skellysolve B gave 0.50 g. of pure 15β-methyl-5β-pregnane-11,20-dione, having a melting point of 122 to 123° C.

*Analysis.*—Calcd. for $C_{22}H_{34}O_2$: C, 79.95; H, 10.37. Found: C, 80.13; H, 10.37.

$\gamma_{max.}^{Nujol}$ 1703, 1275, 1235, 1170 cm.$^{-1}$

Both rotatory dispersion and nuclear magnetic resonance spectrum indicate that the compound lacks the 3-carbonyl function.

B. 0.342 g. of crude crystals on recrystallization from absolute ether yielded 0.13 g. of pure 15β-methyl-5β-pregnane-3,20-dione, with a melting point of 170 to 173° C.

*Analysis.*—Calcd. for $C_{22}H_{34}O_2$: C, 79.95; H, 10.37. Found: C, 79.68; H, 10.29.

$\gamma_{max.}^{Nujol}$ 1705, 1275, 1227, 1173 cm.$^{-1}$

Both rotatory dispersion and nuclear magnetic resonance spectrum indicate that the compound lacks the 11-carbonyl group.

C. 3.313 g. of crude product eluted with 10 to 15% acetone in Skellysolve B on recrystallization from absolute ether gave 1.97 g. of pure 15β-methyl-5β-pregnane-3,11,20-trione (IX), melting at 140 to 141° C.

The infrared spectrum of this compound is identical to that of the previously prepared sample of 15β-methyl-5β-pregnane-3,11,20-trione (IX) of Example 6.

D. The material recovered from the Florisil column by elution with acetone alone was recrystallized from acetone-Skellysolve B and yielded 0.25 g. of 15β-methyl-5α-pregnane-3,11,20-trione, melting at 185 to 188° C.

*Analysis.*—Calcd. for $C_{22}H_{34}O_3$: C, 76.70; H, 9.36. Found: C, 76.63; H, 9.34.

$\gamma_{max.}^{Nujol}$ 1702, 1278, 1233, 1121 cm.$^{-1}$

Infrared and nuclear magnetic resonance spectra as well as rotatory dispersion confirm that the compound recovered from this fraction is 15β-methyl-5α-pregnane-3,11,20-trione.

EXAMPLE 8

*15β-Hydroxy-15α-Methyl-5β-Pregnane-3,11,20- Trione (III)*

A mixture of 15β-hydroxy-15α-methyl-11-ketoprogesterone (II) (5.4 g.), methanol (200 ml.) and 5% palladium on calcium carbonate (2.0 g.) was reduced with hydrogen on a Parr shaker for a period of about 100 minutes. A pressure drop of 21 lbs. occurred. The reduction was stopped, the catalyst removed by filtration, and the solvent removed under reduced pressure. The residue was recrystallized from Skellysolve B-acetone to yield a crystalline product (1.81 g.) of pure 15β-hydroxy-15α-methyl-5β-pregnane-3,11,20-trione (III). A sample recrystallized from aqueous methanol melted at 221 to 223° C.

*Analysis.*—Calcd. for $C_{22}H_{32}O_4$: C, 73.30; H, 8.95. Found: C, 73.29; H, 8.48.

$\gamma_{max.}^{Nujol}$ 3400, 1700, 1688, 1165, 1147 cm.$^{-1}$

Rotatory dispersion indicates that this compound has an A/B cis configuration.

EXAMPLE 8A

*3-Pyridine-Sulfur Dioxide Adduct of 15β-Hydroxy-15α-Methyl-15β-Hydroxy-5β-Pregnane-3,11,20-Trione (III')*

2 g. of 15α-methyl-15β-hydroxy-5β-pregnane-3,11,20-trione (II) in 7 ml. of pyridine was treated in an ice-bath with 1.5 ml. of thionyl chloride for a period of about 15 minutes and the reaction mixture poured into water. Following isolation and purification, a light colored crystalline solid material, the 3-pyridine-sulfur dioxide adduct of 15β-hydroxy-15α-methyl-5β-pregnane - 3,11,20 - trione (III'), was obtained with a melting point of 267 to 273° C. and an ultra-violet spectra showing λ max. (EtOH) 236 and 239 mu with shoulders at 265 and 274 mu.

*Analysis.*—Calcd. for $C_{27}H_{25}O_5NS$: S, 6.74. Found: S, 6.82.

Integration of the C=O absorption in the infra-red shows the presence of only two carbonyl groups.

This compound exhibits marked central nervous system depressing, muscle relaxing, sedative, tranquilizing, anti-fungal and anti-bacterial properties.

EXAMPLE 8B

*3-Pyridine-Sulfur Dioxide Adduct of 5β-Pregnane-3,11,20-Trione*

2 g. of 5β-pregnane-3,11,20-trione in 7 ml. of pyridine was treated in an ice-bath with 1.5 ml. of thionyl chloride for a period of about 15 minutes and the reaction mixture poured into water. Following crystallization and purification, a light colored crystalline solid material, the 3-pyridine-sulfur dioxide adduct of 5β-pregnane-3,11,20-trione, was obtained with a melting point of 270 to 290° C.

*Analysis.*—Calcd. for $C_{26}H_{25}O_5NS$: S, 6.77; N, 2.96. Found: S, 6.75; N, 2.79.

This compound exhibits marked central nervous system depressing, muscle relaxing, sedative, tranquilizing, anti-fungal and anti-bacterial properties.

In the same manner as disclosed in Examples 8A and 8B, other 3-keto-5β-pregnanes such as 5β-pregnane-3,20-dione and 3-keto-5β-androstanes such as 17β-hydroxy-5β-androstan-3-one can be converted to 3-pyridine-sulfur dioxide adducts. These compounds likewise possess central nervous system depressing, muscle relaxing, sedative, tranquilizing, anti-fungal and anti-bacterial properties.

EXAMPLE 9

*15β-Hydroxy-15α-Methyl-5β-Pregnane-3,11,20-Trione 3,20-Bis(Ethylene Ketal) (IV)*

A mixture of 15β-hydroxy-15-methyl-5β-pregnane-3,11,20-trione (II) (2.07 g.), benzene (100 ml.), ethylene glycol (10 ml.), and p-toluenesulfonic acid (0.1 g.) was refluxed for six hours. The reaction mixture was cooled and then the acid neutralized with saturated sodium bicarbonate solution. The organic layer was separated and the solvent was removed in vacuo to yield a residue of 15β-hydroxy-15α-methyl-5β-pregnane-3,11,20-trione 3,20-bis(ethylene ketal) (IV). The infrared absorption spectrum indicated the presence of hydroxyl, carbonyl, and ether oxygen.

EXAMPLE 10

*15-Methyl-14-Dehydro-5β-Pregnane-3,11,20-Trione 3,20 Bis(Ethylene Ketal) (V)*

The product of Example 9 [15β-hydroxy-15α-methyl-5β-pregnane - 3,11,20 - trione 3,20 - bis(ethylene ketal) (IV)] was dissolved in pyridine, cooled to 0° C. and thionyl chloride added. After about 20 minutes the mixture was poured onto ice. The product was extracted with methylene chloride and then chromatographed over Florisil (200 g.). A partially crystalline product (1.42 g.) was eluted with 5–10% acetone-Skellysolve B. A sample of this material, 15-methyl-14-dehydro-5β-pregnane-3,11,20-trione 3,20-bis(ethylene ketal) (V), was recrystallized from methanol and melted at 140 to 143° C.

EXAMPLE 11

*15-Methyl-14-Dehydro-5β-Pregnane-3,11,20-Trione (VIII)*

A mixture of 15 - methyl-14-dehydro-5β-pregnane-3,11,20-trione, 3,20-bis(ethylene ketal) (V) (0.87 g.), acetone (50 ml.), water (10 ml.), and concentrated sulfuric acid (10 drops) was allowed to stand overnight. The mixture was neutralized with saturated sodium bicarbonate solution and the acetone removed under reduced pressure. The water was removed by decantation and the organic residue dissolved in absolute ether. The ether was removed by evaporation and the product (0.67 g.) crystallized to give a compound melting at 126 to 133° C. The product, 15-methyl-14-dehydro-5β-pregnane-3,11,20-trione (VIII), was recrystallized from acetone-Skellysolve B to yield crystals (0.27 g.) melting at 138 to 145° C. The infrared spectrum of this material was identical to that prepared by hydrogenation over palladium of 15-methyl-14-dehydro-11-ketoprogesterone (VIII) of Example 5.

EXAMPLE 12

*15β-Methyl-4-Pregnene-3,11,20-Trione (15β-Methyl-11-Ketoprogesterone) (X)*

A solution of 15β-methyl-5β-pregnane-3,11,20-trione (IX) (prepared as in Example 6) (1.00 g.) in t-butyl alcohol (35 ml.) was treated with t-butyl hypochlorite (0.35 ml.) and a solution of concentrated hydrochloric acid (0.3 ml.) in water (1.5 ml.) and stirred at room temperature for about twenty-four hours. The mixture was then poured into water and twice extracted with methylene chloride. The combined extracts were washed with saturated sodium bicarbonate solution and then dried over sodium sulfate. The solvent was removed in vacuo, leaving an oily residue. The total crude chloro compound was dissolved in redistilled formamide (25 ml.) and heated at about 50 to 60° C. under nitrogen. Semicarbazide hydrochloride (1.38 g.), sodium acetate (1.03 g.) and water (7 ml.) were added. After two hours, pyruvic acid (3.45 ml.) and water (3.45 ml.) were added and heating continued at about 50 to 60° C. for about two and one-half hours. After cooling, the mixture was poured into an excess of saturated sodium bicarbonate solution. The mixture was then extracted three times with methylene chloride solution. The solvent was removed and the residue chromatographed over Florisil (100 g.) and eluted with 75 ml. portions of 10, 15 and 20% acetone in Skellysolve B. The 2 to 6th fractions of 10% acetone eluted essentially starting material (0.377 g.), this fact being confirmed by infrared spectral analysis. The remainder of the 10% and 15% acetone fractions eluted crystalline 15β-methyl-11-ketoprogesterone (X) (0.375 g.). This material was recrystallized from aqueous methanol to give a pure product (0.16 g.) melting at 185 to 187° C.

*Analysis.*—Calcd. for $C_{22}H_{32}O_3$: C, 76.70; H, 9.36. Found: C, 77.00; H, 8.77.

$\lambda_{max.}^{EtOH}$ 238 mμ; ε=15,800.  $\gamma_{max.}^{Nujol}$ 1700, 1675, 1620 cm$^{-1}$

EXAMPLE 12A

*15β-Methyl-4-Pregnene-3,11,20-Trione (15β-Methyl-11-Ketoprogesterone) (X)*

5 g. of 15-methyl-4,15-pregnadiene-3,11,20-trione 3,20-bis(ethylene ketal) (IIIα) (Preparation 6) was dissolved in 200 ml. of ethyl acetate. Platinum oxide catalyst (0.50 g.) was added to the steroid solution, hydrogen gas admitted and the mixture shaken in a semi-micro hydrogenation apparatus for a period of about 70 minutes; the total hydrogen uptake was 283.4 ml. The catalyst was filtered by suction from the solution through a pad of Celite. The pad was rinsed with ethyl acetate and the liquid added to the previously obtained filtrate; the combined organic solutions were concentrated to dryness by distillation under vacuum while on a water bath held at 60° C. The residue, a white crystalline mass of 15β-methyl-4-pregnene-3,11,20-trione 3,20 bis(ethylene ketal), was dissolved in 75 ml. of acetone and 5 ml. of 10% sulfuric acid added thereto. This mixture was refluxed in an atmosphere of nitrogen on a steam bath for a period of about 20 minutes, then cooled to 20° C. and the excess sulfuric acid neutralized by the addition of a solution of sodium bicarbonate. The acetone was removed from the mixture by vacuum distillation, whereupon the product precipitated as nearly white crystals which were collected by suction filtration and washed with deionized water. This material was dried under vacuum at 40° C. to give 3.96 g. (96% yield) of product melting at 165 to 172° C. An analytical sample of this compound, by recrystallization from acetone-Skellysolve B, 15β-methyl-4-pregnene-3,11,20-trione (X), had a melting point of 185 to 187° C.; its infrared spectrum was identical to the spectrum of a sample prepared in a different manner.

EXAMPLE 12B

*15-Methylene-4-Pregnene-3,11,20 - Trione 3,20-Bis(Ethylene Ketal) (15-Methylene-11-Ketoprogesterone 3,20-Bis[Ethylene Ketal])*

A mixture of 24 g. of methyl triphenylphosphonium bromide and 260 ml. of benzene was distilled until the distillate was clear, after which the mixture was heated at refluxing temperature. 50 ml. of absolute ether was added thereto and then a suspension of 15 ml. of 26% n-butyl lithium in heptane added and the mixture heated at refluxing temperature for a period of about 90 minutes. A solution of 5 g. of 4-pregnene-3,11,15,20-tetraone 3,20-bis (ethylene ketal) (synthesized as in Preparation 3) in 100 ml. of benzene was distilled to remove the water contained therein, then added to the above-prepared reagent and heating of the mixture continued at refluxing temperature for a period of about 3 hours. The reaction mixture was cooled, diluted with water and the organic layer separated and washed successively with dilute hydrochloric acid, water, saturated sodium bicarbonate solution, again with water and the solvent removed to yield a crystalline residue. This material was recrystallized from methanol to give 2.3 g. of product melting at 155 to 165° C. Purification of this product by chromatographing on a column of Florisil and elution therefrom with 3% acetone in Skellysolve B, yielded 15-methylene-4-pregnene-3,11,20-trione 3,20-bis(ethylene ketal) with a melting point of 175 to 179° C. following crystallization from a mixture of acetone and hexanes.

EXAMPLE 12C

15β-Methyl-4-Pregnene-3,11,20-Trione (15β-Methyl-11-Ketoprogesterone) (X)

4 g. of 15-methylene-4-pregnene-3,11,20-trione 3,20-bis(ethylene ketal) (prepared as in Example 12B) was dissolved in 160 ml. of ethyl acetate. 0.5 g. of platinum oxide catalyst was added to the steroid solution, hydrogen gas admitted and the mixture shaken in a hydrogenation apparatus for a period of about 90 minutes. The catalyst was filtered by suction from the solution through a pad of Celite and the organic solution concentrated to dryness by distillation under vacuum while on a water bath kept at about 60° C. The residue, a white crystalline mass of 15β-methyl-4-pregnene-3,11,20-trione 3,20-bis(ethylene ketal), containing a small amount of the corresponding 15α-methyl isomer as a contaminant, was purified by chromatographing over a column of Florisil. The pure 15β-methyl-4-pregnene-3,11,20-trione 3,20-bis(ethylene ketal) was dissolved in 75 ml. of acetone and 5 ml. of 10% sulfuric acid added thereto. The mixture was refluxed in an atmosphere of nitrogen on a steam bath for a period of about 20 minutes, then cooled to 20° C. and the excess sulfuric acid neutralized by the addition of a solution of sodium bicarbonate. The acetone was removed by vacuum distillation, whereupon the product precipitated as nearly white crystals which were collected by suction filtration and washed with deionized water. Recrystallization from aqueous methanol yielded pure 15β-methyl-4-pregnene-3,11,20-trione (X).

EXAMPLE 13

Methyl-15β-Methyl-3,11-Diketo-4,17(20)-Pregnadien-21-Oate (XI)

A solution of 15β-methyl-11-ketoprogesterone (X) (1.85 g.) in t-butyl alcohol (20 ml.) and ethyl oxalate (3.0 ml.) was heated to about 60° C. under nitrogen. A solution of sodium methoxide in methanol (3.0 g. of a 26% solution) was added. Heating was stopped and the mixture allowed to cool to room temperature. After about one hour and 15 minutes the reaction mixture was cooled in an ice bath, a solution of sodium acetate (0.68 g.) and acetic acid (0.79 ml.) in methanol (45 ml.), that had previously been cooled to 0° C., was added and the mixture stirred until nearly all of the precipitated sodium enolate redissolved. The reaction mixture was cooled to 4° C. and a solution of bromine (2.7 g.) in methanol (27 ml.) added, at such a rate that the temperature did not rise above 5° C., until a bromine color persisted (3.0 ml. of the solution was not added). After stirring for twenty minutes, a solution of sodium methoxide in methanol (7.2 g. of a 26% solution) was added. The reaction mixture became a reddish-orange and then faded to a green. A crystalline precipitate appeared. After stirring for about one hour, zinc powder (2.00 g.) and acetic acid (5 ml.) was added. The reaction mixture was filtered through Supercel (diatomaceous earth), the solvent reduced in volume and the residue partitioned between methylene chloride and water. The organic extracts were washed with saturated sodium bicarbonate solution and the solvent removed in vacuo. The product was chromatographed over a column of Florisil (160 g.) and the column eluted with 200 ml. portions of 8% and 10% acetone in Skellysolve B. A crystalline product, methyl-15β-methyl-3,11-diketo-4,17(20)-pregnadiene-21-oate (XI) (1.113 g.), was eluted with 10% acetone in Skellysolve B and was recrystallized from methanol to yield pure crystals (0.84 g.) melting at 220 to 224° C.

*Analysis.*—Calcd. for $C_{23}H_{30}O_4$: C, 74.56; H, 8.16. Found: C, 74.57; H, 8.36.

$\lambda_{EtOH}^{max}$ 233.5 m$\mu$; $\epsilon = 24,700$. $\gamma_{Nujol}^{max}$ 1717, 1695, 1653, 1675, 1214, 1175, 1160 cm.$^{-1}$ In the above reaction other alkyl oxalates may be used such as methyl oxalate, propyl oxalate, isopropyl oxalate and so on. After the bromine addition instead of using sodium methoxide solution in Example 13, other alkali metal alkoxides can be used such as the sodium or potassium ethoxides, sodium or potassium isopropoxides and the like in the corresponding alkanol resulting in the corresponding ethyl, isopropyl and other alkyl esters of 15β-methyl-4,17(20)-pregnadien-3,11-dione-21-oate (XI).

EXAMPLE 14

15β-Methyl-11β,21-Dihydroxy-4,17(20)-Pregnadien-3-One (XII)

A mixture of methyl 15β-methyl-3,11-diketo-4,17(20)-pregnadien-21-oate (XI) (0.80 g.), benzene (16 ml.), pyrrolidine (0.5 ml.) and p-toluenesulfonic acid (0.02 g.) was heated at reflux under nitrogen for about one hour. The solvent was removed in vacuo and the residue was redissolved in benzene (10 ml.) and added to a prepared solution of lithium aluminum hydride (0.5 g.) in absolute ether and then washed with an additional portion of benzene (5 ml.). After stirring for two hours at room temperature, the excess hydride was destroyed by the cautious addition of ethyl acetate (20 ml.) and water (1.5 ml.). The solvent was removed in vacuo and then a solution of acetic acid (1.5 ml.) in methanol (34 ml.) was added and stirred for 15 minutes. Aqueous sodium hydroxide (1 g. dissolved in 10 ml.) was added and stirred for 15 minutes. Acetic acid (1.25 ml.) was then added and the solvent volume reduced one half in vacuo. A solution of concentrated sulfuric acid (2.0 ml.) in water (35 ml.) was added and the mixture again stirred for 15 minutes. The mixture was then twice extracted with methylene chloride, the extracts washed with saturated sodium bicarbonate solution and the solvent removed in vacuo, to give a residue of 15β-methyl-11β,21-dihydroxy-4,17(20)-pregnadien-3-one (XII).

EXAMPLE 15

15β-Methyl-11β,21-Dihydroxy-4,17(20)-Pregnadien-3-One 21-Acetate (15β-Methyl-21-Acetoxy-11β-Hydroxy-4,17(20)-Pregnadien-3-One) (XIII)

The residue recovered from Example 14 was acetylated with pyridine (3.0 ml.) and acetic anhydride (3.0 ml.). After standing about 18 hours, the reaction mixture was diluted with water, concentrated hydrochloric acid (3.0 ml.) added and the product extracted twice with methylene chloride. The extracts were washed with sodium bicarbonate solution and the solvent removed. The product was chromatographed over Florisil (70 g.) and eluted with 75 ml. portions of 5% and 10% acetone in Skellysolve B. The crystalline product (0.665 g.) which was eluted with the 10% fractions was used directly in the next reaction without further purification. The infrared absorption spectrum of the product was consistent with the expected structure of 15β-methyl-11β,21-dihydroxy-4,17(20)-pregnadien-3-one 21-acetate (XIII).

Using for the acylation, instead of acetic anhydride, propionic, butyric, hexanoic, isovaleric, β-cyclopentylpropionic, succinic, benzenesulfonic or other anhydrides, the corresponding propionate, butyrate, hexanoate, isovalerate, β-cyclopentylpropionate, succinate, benzenesulfonate and the like of 15β-methyl-11β,21-dihydroxy-4,17(20)-pregnadien-3-one (XIII) is obtained.

Example 16

*15β - Methyl - 11β,17α,21 - Trihydroxy - 4 - Pregnene-3,20 - Dione - 21 - Acetate (15β - Methylhydrocortisone 21-Acetate) (XIV)*

A reaction mixture consisting of 15β-methyl-21-acetoxy - 11β - hydroxy - 4,17(20) - pregnadien - 3 - one (XIII) (0.658 g.), t-butyl alcohol (25 ml.), pyridine (0.3 ml.), N-methylmorpholine oxide-peroxide solution in t-butyl alcohol (2.8 ml. [1 ml. required 41.3 ml. of 0.1 N sodium thiosulfate for titration]) and a solution of osmium tetroxide in t-butyl alcohol (3.0 ml. [containing 2.7 mg. of osmium tetroxide]) was allowed to stir overnight at room temperature. The solvent was then removed in vacuo and the residue partitioned between methylene chloride and water. The methylene chloride extract was dried over sodium sulfate and the solvent removed under reduced pressure. The residue was chromatographed over Florisil (70 g.) and eluted with 75 ml. portions of 10, 15, and 20% acetone in Skellysolve B. The product (.330 g.) was eluted with the 20% acetone-Skellysolve B fraction. Recrystallization from methanol yielded the desired product, 15β-methyl-11β,17α,21 - trihydroxy - 4 - pregnene - 3,20 - dione 21-acetate (XIV), (0.218 g.) melting at 212 to 215° C. on a stage that had previously been heated to 200° C.

*Analysis.*—Calcd. for $C_{24}H_{34}O_6$: C, 68.87; H, 8.19. Found: C, 68.45; H, 8.28.

$\lambda_{EtOH}^{max}$ 242 mμ; ε=15,950. $[\alpha]_D$ (acetone) + 114°. $\gamma_{Nujol}^{max}$ 3420, 3300, 3220, sh., 1746, 1725, 1660 sh., 1635, 1622, 1275, 1240, 1055 sh., 1050 cm.$^{-1}$ Following the procedure of Example 16, but instead of 15β - methyl - 21 - acetoxy - 11β - hydroxy - 4,17(20)-pregnadien-3-one (XIII) substituting another corresponding 21-acylate therefor, e.g., one of those disclosed at the end of Example 15, produces the corresponding 15β-methylhydrocortisone 21-acylate (XIV).

Example 17

*15β-Methyl-11β-17α,21-Trihydroxy-4-Pregnene-3,20-Dione (15β-Methylhydrocortisone) (XIV')*

Through a solution of 0.5 gram of 15β-methylhydrocortisone 21-acetate (XIV) in 15 milliliters of ethanol was passed a current of nitrogen for a period of about 15 minutes. To this solution was then added three milliliters of 95% ethanol containing 0.3 gram of potassium carbonate, similarly purged with nitrogen. The mixture was allowed to stand in a nitrogen atmosphere for a period of about four hours and then poured into water and neutralized by the addition of five percent hydrochloric acid. The precipitated material was collected on a filter and recrystallized three times from acetone and Skellysolve B hexanes to give 15β-methylhydrocortisone (XIV') in light-colored crystalline form.

15β-methylhydrocortisone (XIV') is converted to desired 21-esters (XIV) by reaction with the appropriate acid anhydride, acid chloride, or bromide or by other methods known in the art, e.g., by ester exchange, acid in the presence of an esterification catalyst, etc., to produce 15β - methyl - 11β,17α,21 - trihydroxy - 3,20 - dione 21-acylates (XIV) which include those wherein the acyl radical of the 21-acylate group is the acyl radical of, for example, a lower aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β - cyclopentylpropionic, cyclohexylformic, cyclohexylacetic, β-cyclohexylpropionic, an aryl or alkaryl acid, e.g., benzoic 2, 3, or 4-methyl-benzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid, (which can be converted to water soluble, e.g., sodium salts), e.g., succinic, glutaric, α-methylglutaric, β-methylglutaric, β,β-dimethylglutaric, adipic, pimelic, suberic, a hydroxyacid, e.g., glycolic, lactic, citric, tartaric, d-maleic, d-glyceric, mannonic, gluconic, salicylic, 2,3,4-trimethoxybenzoic, α-naphoxyacetic, or other acyl acid.

Following the procedure of Example 17, but substituting another 21-acylate of 15β-methylhydrocortisone (XIV) as starting material, also yields 15β-methylhydrocortisone (XIV').

Example 18

*15β - Methyl - 11β,17α,21 - Trihydroxy - 1,4 - Pregnadiene - 3,20 - Dione (15β - Methyl - 1 - Dehydrohydrocortisone) (15β-Methylprednisolone) (XV)*

Six 100-milliliter portions of a medium in 250-milliliter Erlenmeyer flasks containing one percent glucose, two percent corn steep liquor (60 percent solids) and tap water was adjusted to a pH of 4.9. This medium was sterilized for 45 minutes at 15 pounds per square inch pressure and inoculated with a one to two day growth of Septomyxa affinis A.T.C.C. 6737. The Erlenmeyer flasks were shaken at room temperature at about 24 degrees centigrade for a period of three days. At the end of this period, this 600-milliliter volume was used as an inoculum for ten liters of the same glucose-corn steep liquor medium which in addition contained ten milliliters of an anti-foam (a mixture of lard oil and octadecanol). The fermentor was placed into the water bath, adjusted to 28 degrees centigrade, and the contents stirred (at 300 r.p.m.) and aerated (0.5 liter of air per ten liters of beer per minute). After 17 hours of incubation, when a good growth developed and the acidity rose to pH 6.7, two grams of 15β-methylhydrocortisone (XIV') plus one gram of 3-ketobisnor-4-cholen-22-al, dissolved in 115 milliliters of dimethylformamide, was added and the incubation carried out at the same temperature and aeration for 24 hours. The mycelium was filtered off and the steroidal material was extracted with methylene chloride. The methylene chloride solution was evaporated to dryness and the resulting residue chromatographed over a Florisil column. The fraction containing 15β-methylprednisolone as determined by paper chromatography was separated, evaporated and the product recrystallized from acetone to give pure 15β-methylprednisolone (XV).

Example 19

*15β-Methyl-11β,17α,21-Trihydroxy-1,4-Pregnadiene 3,20-Dione (15β-Methylprednisolone) (XV)*

Following the procedure of Example 18, but substituting a 15β-methyl-11β,17α,21-trihydroxy-4-pregnene-3,20-dione 21-acylate (XIV) as starting material is productive of 15β-methyl-11β,17α,21-trihydroxy-1,4-pregnadiene-3,20-dione (15β-methylprednisolone) (XV).

In the manner of the procedure disclosed in the paragraph following Example 17, 15β-methylprednisolone (XV) is converted to desired 21-esters such as 15β-methylprednisolone 21-acetate (XV'), 15β-methylprednisolone 21 butyrate (XV') and the like.

Example 20

*15β - Methyl-17α,21-Dihydroxy-1,4-Pregnadiene-3,11,20-Trione 21-Acetate (15β-Methylprednisone 21-Acetate) (XVI)*

To a solution of 2.5 millimoles of 15β-methyl-11β,17α, 21-trihydroxy - 1,4 - pregnadiene-3,20-dione 21-acetate (XV') and two milliliters of pyridine in 75 milliliters of tertiary butanol was added 500 milligrams of N-bromoacetamide. The reaction mixture was maintained at room temperature for about sixteen hours whereupon the solution was diluted with fifty milliliters of water containing 500 milligrams of sodium sulfite, and the mixture was then concentrated at reduced pressure to about forty milliliters. The distillation residue was refrigerated, filtered, and the filter cake was washed with water and then dried. It consisted of 15β-methyl-17α,21-dihydroxy-1,4-pregnadiene-3,11,20-trione 21-acetate (XVI).

EXAMPLE 21

*15β-Methyl - 17α,21 - Dihydroxy-4-Pregnene-3,11,20-Trione 21-Acetate (15β-Methylcortisone 21-Acetate) (XVI)*

Following the procedure of Example 20, but substituting 15β-methyl-11β,17α,21-trihydroxy-4-pregnene-3,20-dione 21-acetate (XIV) as starting compound, there is thus produced 15β-methyl-17α,21-dihydroxy-4-pregnene-3,11,20-trione 21-acetate (XVI).

Similarly, substituting another 21-acylate of 15β-methyl-11β,17α,21-trihydroxy - 1,4 - pregnadiene-3,20-dione (XV') or 21-acylate of 15β-methyl-11β,17α,21-trihydroxy-4-pregnene-3,20-dione (XIV) wherein the acyl radical is, e.g., that of an acid named in the paragraph following Example 17, as the starting compound in the oxidation reaction described in Example 20, there is thus produced the corresponding 21-acylate of 15β-methyl-17α,21-dihydroxy-1,4-pregnadiene-3,11,20-trione (XVI) and of 15β-methyl-17α,21 - dihydroxy-4 - pregnene-3,11,20 - trione (XVI), respectively.

EXAMPLE 22

*15β-Methyl-17α,21-Dihydroxy-1,4,9(11)-Pregnatriene-3,20-Dione 21-Acetate (XVII)*

To a solution of 8.5 grams of 15β-methyl-11β,17α,21-trihydroxy-1,4-pregnadiene-3,20-dione 21-acetate (XV') in 42.5 milliliters of pyridine was added 5.63 grams of N-bromoacetamide. After standing at room temperature for a period of fifteen minutes, the reaction solution was cooled to five to ten degrees centigrade and sulfur dioxide gas was passed over the surface of the solution while shaking the flask until the solution gave no color with acidified starch-iodide paper. During the addition of the sulfur dioxide, the reaction mixture became warm. The temperature was kept under thirty degrees centigrade by external cooling and by varying the rate of sulfur dioxide addition. Thereafter to the reaction mixture was added 400 milliliters of ice water and the resulting precipitate was collected by filtration. This material was recrystallized from acetone-Skellysolve B hexanes to give 15β-methyl-17α,21-dihydroxy - 1,4,9(11) - pregnatriene-3,20-dione 21-acetate (XVII).

EXAMPLE 23

*15β-Methyl-17α,21-Dihydroxy-4,9(11)-Pregnadiene-3,20-Dione 21-Acetate (XVII)*

Following the procedure of Example 22, but substituting 15β-methyl-11β,17α,21-trihydroxy-4-pregnene-3,20-dione 21-acetate (XIV) as the starting compound, there is thus produced 15β-methyl-17α,21-dihydroxy-4,9(11)-pregnadiene-3,20-dione 21-acetate (XVII).

Similarly, substituting another 21-acylate of 15β-methyl - 11β,17α,21-trihydroxy-1,4-pregnadiene - 3,20 - dione (XV') or a 21-acylate of 15β-methyl-11β,17α,21-trihydroxy-4-pregnene-3,20-dione (XIV) wherein the acyl radical is, e.g., that of an acid named in the paragraph following Example 17, as the starting compound in the dehydration reaction described in Example 22, there is thus produced the corresponding 21-acylate of 15β-methyl-17α,21-dihydroxy-1,4,9(11)-pregnatriene-3,20-dione (XVII) and of 15β-methyl-17α,21-dihydroxy-4,9(11)-pregnadiene-3,20-dione (XVII), respectively.

EXAMPLE 24

*9α-Bromo-15β-Methyl - 11β,17α,21 - Trihydroxy - 1,4-Pregnadiene-3,20-Dione 21-Acetate (9α-Bromo-15β-Methylprednisolone 21-Acetate) (XVIII)*

To a solution of 5.68 grams of 15β-methyl-17α,21-dihydroxy - 1,4,9(11) - pregnatriene - 3,20 - dione 21-acetate (XVII) in 100 milliliters of methylene chloride and 250 milliliters of tertiary butyl alcohol was added a solution of fourteen milliliters of 72 percent perchloric acid in 100 milliliters of water followed by a solution of 2.34 grams of N-bromoacetamide in sixty milliliters of tertiary butyl alcohol. After stirring the reaction mixture for fifteen minutes, a solution of 2.8 grams of sodium sulfite in 140 milliliters of water was added and the reaction mixture was concentrated to a volume of about 500 milliliters under reduced pressure at about fifty degrees centigrade. The concentrate was cooled in an ice bath and while stirring 500 milliliters of water was added. After stirring for a period of one hour, the precipitated product was isolated by filtration, and the cake washed with water and air dried to give 9α-bromo-15β-methyl-11β,17α,21-trihydroxy-1,4-pregnadiene-3,20-dione 21-acetate (XVIII).

EXAMPLE 25

*9α - Bromo - 15β - Methyl-11β,17α,21-Trihydroxy-4-Pregnene-3,20-Dione 21-Acetate (9α-Bromo-15β-Methylhydrocortisone 21-Acetate) (XVIII)*

Following the procedure of Example 24, but substituting 15β - methyl-17α,21-dihydroxy-4,9(11)-pregnadiene-3,20-dione 21-acetate (XVII) as the starting compound, there is thus produced 9α-bromo-15β-methyl-11β,17α,21-trihydroxy-16α-methyl-4-pregnene-3,20 - dione 21-acetate (XVIII).

Similarly, substituting another 21-acylate of 15β-methyl-17α,21-dihydroxy-1,4,9(11)-pregnatriene - 3,20 - dione (XVII) or a 21-acylate of 15β-methyl-17α,21-dihydroxy-4,9(11)-pregnadiene-3,20-dione (XVII) wherein the acyl radical is, e.g., that of an acid named in the paragraph following Example 17, as the starting compound in the reaction described in Example 24, there is thus produced the corresponding 21-acylate of 9α-bromo-15β-methyl-11β,-17α,21-trihydroxy-1,4-pregnadiene - 3,20 - dione (XVIII) and of 9α - bromo - 15α-methyl-11β,17α,21-trihydroxy-4-pregnene-3,20-dione (XVIII), respectively.

Substituting N-chlorosuccinimide for the N-bromoacetamide in the reactions described in Example 24, 25 and the paragraph following Example 25 is productive of the corresponding 9α-chloro compounds, e.g. 9α-chloro-15β - methyl - 11β,17α,21 - trihydroxy - 1,4 - pregnadiene-3,20-dione 21-acetate (XVIII) and 9α-chloro-15β,17α, 21-trihydroxy-4-pregnene-3,20-dione 21-acetate (XVIII).

EXAMPLE 26

*15β - Methyl - 9β,11β - Epoxy - 17α21 - Dihydroxy - 1,4-Pregnadiene-3,20-Dione 21-Acetate (XIX)*

To a solution of 6.78 grams of 9α-bromo-15β-methyl-11β,17α,21-trihydroxy-1,4-pregnadiene-3,20-dione 21-acetate (XVIII) in 175 milliliters of acetone was added 6.78 grams of potassium acetate and the resulting suspension was heated under reflux for a period of seventeen hours. The mixture was then concentrated to approximately sixty milliliters volume at reduced pressure on the steam bath, diluted with water and extracted with methylene chloride. The methylene chloride extracts were combined, washed with water, dried over anhydrous sodium sulfate and evaporated. The residue was redissolved in methylene chloride and chromatographed over 500 grams of Florisil anhydrous magnesium silicate. The column was eluted with one-liter portions of hexanes (Skellysolve B) containing increasing proportions of acetone. There was thus eluted 15β - methyl - 9β,11β-epoxy-17α,21-dihydroxy-1,4-pregnadiene-3,20-dione 21-acetate (XIX) which was freed of solvent by evaporation of the eluates.

EXAMPLE 27

*15β - Methyl - 9β,11β - Epoxy - 17α,21 - Dihydroxy - 4-Pregnene-3,20-Dione 21-Acetate (XIX)*

Following the procedure of Example 26, but substituting 9α - bromo-15β-methyl-11β,17α,21-trihydroxy-4-pregnene-3,20-dione 21-acetate (XVIII) as the starting compound, there is thus produced 15β-methyl-9β,11β-epoxy-17α,21-dihydroxy - 4 - pregnene - 3,20 - dione 21 - acetate (XIX).

Similarly, substituting another 21-acylate of 9α-bromo-15β - methyl - 11β,17α,21 - trihydroxy - 1,4 - pregnadiene-3,20-dione (XVIII) or a 21-acylate of 9α-bromo-15β-methyl - 11β,17α,21 - trihydroxy - 4 - pregnene - 3,20-dione (XVIII) wherein the acyl radical is, e.g., that of an acid named in the paragraph following Example 17, as the starting compound in the reaction described in Example 26, there is thus produced the corresponding 21-acylate of 15β-methyl-9β,11β-epoxy-17α,21-dihydroxy-1,4-pregnadiene-3,20-dione (XIX) and of 15β-methyl-9β,-11β-epoxy-17α,21 - dihydroxy - 4 - pregnene - 3,20 - dione (XIX), respectively.

EXAMPLE 28

*9α - Fluoro - 15β - Methyl - 11β,17α,21 - Trihydroxy - 1,4-Pregnadiene-3,20-Dione 21-Acetate (9α-Fluoro-15β-Methylprednisolone 21-Acetate) (XX)*

To approximately 1.3 grams of hydrogen fluoride contained in a polyethylene bottle and maintained at minus sixty degrees centrigrade was added 2.3 milliliters of tetrahydrofuran and then a solution of 500 milligrams (0.0012 mole) of 15β-methyl-9β,11β-epoxy-17α,21-dihydroxy-1,4-pregnadiene-3,20-dione 21-acetate (XIX) in two milliliters of methylene chloride. The steroid solution was rinsed in with an additional one milliliter of methylene chloride. The light red colored solution was then kept at approximately minus thirty degrees centigrade for one hour and at minus ten degrees for two hours. At the end of this period it was mixed cautiously with an excess of cold sodium bicarbonate solution and the organic material extracted with the aid of additional methylene chloride. The combined extracts were washed with water, dried over anhydrous sodium sulfate and concentrated to approximately 35 milliliters. The solution was chromatographed over 130 grams of Florisil anhydrous magnesium silicate. The column was developed with 260-milliliter portions of hexanes (Skellysolve B) containing increasing proportions of acetone. There was thus eluted 9α-fluoro-15β - methyl - 11β,17α,21 - trihydroxy - 1,4 - pregnadiene-3,20-dione 21-acetate (XX) which was freed of solvent by evaporation of the eluate fractions.

EXAMPLE 29

*9α - Fluoro - 15β - Methyl - 11β,17α,21 - Trihydroxy - 4-Pregnene-3,20-dione 21-Acetate (9α-Fluoro-15β-Methylhydrocortisone 21-Acetate) (XX)*

Following the procedure of Example 28, but substituting 15β - methyl - 9β,11β-epoxy-17α,21-dihydroxy-4-pregnene-3,20-dione 21-acetate (XIX) as the starting compound, there is thus produced 9α-fluoro-15β-methyl-11β,-17α21-trihydroxy-4-pregnene-3,20-dione 21-acetate (XX).

Similarly, substituting another 21-acylate of 15β-methyl-9β,11β-epoxy17α,21-dihydroxy-1,4-pregnadiene - 3,20-dione (XIX) or a 21-acelate of 15β-methyl-9β,11β-epoxy-17α,21-dihydroxy-4-pregnene-3,20-dione (XIX) wherein the acyl radical is, e.g., that of an acid named in the paragraph following Example 17, as the starting compound in the reaction described in Example 28, there is thus produced the corresponding 21-acylate of 9α-fluoro-15β-methyl-11β,17α,21-trihydroxy-1,4-pregnadiene - 3,20-dione (XX) and of 9α-fluoro-15β-methyl-11β,17α,21-trihydroxy-4-pregnene-3,20-dione (XX), respectively.

EXAMPLE 30

*9α-Fluoro - 15β - Methyl - 17α-21-Dihydroxy-1,4-Pregnadiene-3,11-20-Trione 21-Acetate (9α-Fluoro-15β-Methylprednisone 21-Acetate) (XXI)*

A solution was prepared containing one milliliter of acetic acid, fifty milligrams of 9α-fluoro-15β-methyl-11β, 17α,21-trihydroxy-1,4-pregnadiene-3,20 dione 21-acetate (XX), twenty milligrams of chromic anhydride and one drop (approximately fifty milligrams) of water. This mixture was shaken several times at room temperature and allowed to stand for four hours. Thereafter it was poured into ten milliliters of water and refrigerated for twenty hours at about five degrees centigrade. The steroid which separated from the aqueous mixture was collected on filter paper and dried to give 9α-fluoro-15β-methyl-17α,21-dihydroxy-1,4-pregnadiene - 3,11,20- trione 21-acetate (XXI).

EXAMPLE 31

*9α-Fluoro-15β-Methyl-17α,21 - Dihydroxy-4 - Pregnene-3,11,20-Trione 21-Acetate ( 9α-Fluoro-15β-Methylcortisone 21-Acetate) (XXI)*

Following the procedure of Example 30, but substituting 9α-fluoro-15β-methyl-11β,17α,21-trihydroxy-4 - pregnene-3,20-dione 21-acetate (XX) as the starting compound, there is thus produced 9α-fluoro-15β-methyl-17α, 21-dihydroxy-4-pregnene-3,11,20-trione 21-acetate (XXI).

Similarly, substituting another 21-acylate of 9α-fluoro-15β-methyl-11β,17α,21-trihydroxy-1,4-pregnadiene - 3,20-dione (XX) or a 21-acylate of 9α-fluoro-15β-methyl-11β, 17α,21-trihydroxy-4-pregnene-3,20-dione (XX) wherein the acyl radical is, e.g., that of an acid named in the paragraph following Example 17, as the starting compound in the oxidation reaction described in Example 30, there is thus produced the corresponding 21-acylate of 9α-fluoro-15β-methyl-17α,21-hydroxy-1,4 - pregnadiene-3,11,20-trione (XXI) and of 9α-fluoro-15β-methyl-17α,21-dihydroxy-4-pregnene-3,11,20- trione (XXI), respectively.

EXAMPLE 32

*9α-Fluoro-15β-Methyl-11β,17α,21-Trihydroxy-1,4 - Pregnadiene-3,20-Dione (9α-Fluoro-15β - Methylprednisolone) (XX')*

Three and one-quarter (3.25) grams of 9α-fluoro-15β-methyl-11β,17α,21-trihydroxy-1,4-pregnadiene-3,20 - dione 21-acetate (XX) was dissolved in 325 milliliters of methanol, previously purged of air-oxygen by passing nitrogen through it for ten minutes and thereto was added a solution of 1.63 grams of potassium bicarbonate in thirty milliliters of water, similarly purged of oxygen. The mixture was allowed to stand at room temperature for a period of five hours in a nitrogen atmosphere, thereupon neutralized with 2.14 milliliters of acetic acid in forty milliliters of water. The mixture was concentrated to approximately one-third volume at reduced pressure on a sixty-degree-centigrade water-bath. Thereupon 250 milliliters of water was added and the mixture chilled. The crystalline product was collected on a filter washed with water and dried to give 9α-fluoro15β-methyl-11β, 17α,21-trihydroxy-1,4-pregnadiene-3,20-dione (XX').

EXAMPLE 33

*9α-Fluoro-15β-Methyl-11β,17α,21-Trihydroxy - 4 - Pregnene-3,20 Dione (9α-Fluoro-15β-Methyl - Hydrocortisone) (XX')*

Following the procedure of Example 32, but substituting 9α-fluoro-15β-methyl-11β,17α,21 - trihydroxy-4-pregnene-3,20-dione 21-acetate (XX) as the starting compound, there is thus produced 9α-fluoro-15β-methyl-11β,17α,21-trihydroxy-4-pregnene-3,20-dione (XX').

Similarly, 9α-fluoro-15β-methyl-17α,21-dihydroxy - 4-pregnene-3,11,20-trione 21-acetate (XXI) is hydrolyzed to 9α-fluoro-15β-methyl-17α,21-dihydroxy-4-pregnene - 3, 11,20-trione and 9α-fluoro-15β-methyl-17α,21-dihydroxy-1,4-pregnadiene-3,11,20-trione 21-acetate (XXI) is hydrolyzed to 9α-fluoro-15β-methyl-17α,21-dihydroxy - 1,4-pregnadiene-3,11,20-trione. The corresponding 9α-chloro compounds are similarly prepared by hydrolysis of their 21-acetates, e.g., 9α-chloro-15β-methyl-11β,17α,21-trihydroxy-1,4-pregnadiene-3,20-dione and 9α-chloro - 15β-methyl-11β,17α,21-trihydroxy-4-pregnene-3,20 - dione are prepared from 9α-chloro-15β-methyl-11β,17α21 - trihydroxy-1,4-pregnadiene-3,20-dione 21-acetate and from 9α-chloro-15β-methyl-11β,17α,21-trihydroxy-4-pregnene - 3, 20-dione 21-acetate, respectively.

EXAMPLE 33A

9α-Fluoro-15β-Methyl-11β,17α,21-Trihydroxy - 4 - Pregnene-3,20-Dione 21-Hemisuccinate, Sodium Salt (XX)

(a) A solution was prepared containing excess succinic anhydride and 9α-fluoro-15β-methyl-11β,17α,21 - trihydroxy-4-pregnene-3,20-dione (XX') (prepared in the manner disclosed in Example 33) in pyridine. The solution was allowed to stand for about 20 hours, diluted with water and the mixture refrigerated and filtered. The precipitate collected on the filter was recrystallized twice from methanol to yield 9α-fluoro-15β-methyl-11β,17α,21-trihydroxy-4-pregnene-3,20-dione 21-hemisuccinate (XX).

(b) 0.1 Normal sodium hydroxide solution was slowly added to a stirred solution of 9α-fluoro-15β-methyl-11β, 17α,21-trihydroxy-4-pregnene-3,20-dione 21 - hemisuccinate dissolved in acetone, until the pH rose to about 7.4. During the addition of sodium hydroxide solution, a small amount of water was also added. The solution was concentrated at room temperature under vacuum to remove the acetone. The aqueous solution was filtered, freeze-dried and recrystallized to give pure 9α-fluoro-15β-methyl-11β,17α,21-trihydroxy-4-pregnene-3,20 - dione 21-hemisuccinate, sodium salt (XX).

Following the procedure of Example 33A, but substituting, as starting materials, 9α-fluoro-15β-methyl-11β, 17α,21-trihydroxy-1,4-pregnadiene-3,20-dione (XX'), 15β-methyl-11β,17α,21 - trihydroxy - 4 - pregnene - 3,20-dione (XIV') and 15β-methyl - 11β,17α,21-trihydroxy-1,4-pregnadiene-3,20-dione (XV) (prepared in the manner disclosed in Examples 32, 17 and 18, respectively) is productive of 9α-fluoro - 15β - methyl-11β,17α,21-trihydroxy-1,4-pregnadiene-3,20-dione 21-hemisuccinate, sodium salt (XX), 15β-methyl-11β,17α,21 - trihydroxy - 4 - pregnene-3,20 dione 21-hemisuccinate, sodium salt (XIV) and 15β-methyl - 11β,17α,21 - trihydroxy - 1,4 - pregnadiene-3,20-dione 21-hemisuccinate, sodium salt (XV'), respectively.

EXAMPLE 34

9α-Fluoro-15β-Methyl - 11β,17α,21 - Trihydroxy 1,4-Pregnadiene-3,20 - Dione 21 - Propionate (9α - Fuoro - 15β - Methylprednisolone 21-Propionate) (XX)

A solution was prepared containing fifty milligrams of 9α-fluoro-15β-methyl - 11β,17α,21 - trihydroxy-1,4-pregnadiene-3,20-dione (XX') in one milliliter of pyridine and one milliliter of propionic anhydride. The solution was allowed to stand at room temperature for a period of 21 hours and was thereupon poured into ten milliliters of water. The reaction mixture was then extracted with three ten-milliliter portions of methylene chloride, the methylene chloride extracts were combined, washed with water, dried over anhydrous sodium sulfate and evaporated to give a residue of 9α-fluoro-15β-methyl-11β,17α, 21-trihydroxy - 1,4 - pregnadiene-3,20-dione 21-propionate (XX).

EXAMPLE 35

9α-Fluoro-15β - Methyl - 11β,17α,21 - Trihydroxy-4-Pregnene-3,20-Dione 21-Propionate (9α-Fluoro-15β-Methylhydrocortisone 21-Propionate) (XX)

Following the procedure of Example 34, but substituting 9α-fluoro-15β-methyl - 11β,17α,21 - trihydroxy-4-pregnene-3,20-dione (XX') as starting compound, there is thus produced 9α-fluoro - 15β - methyl - 11β,17α,21-trihydroxy-4-pregnene-3,20-dione 21-propionate (XX).

Similarly, 9α-fluoro-15β-methyl - 17α,21-dihydroxy-1,4-pregnadiene-3,11,20-trione is converted to 9α-fluoro-15β-methyl-17α,21-dihydroxy - 1,4-pregnadiene-3,11,20-trione 21-propionate (XXI) and 9α-difluoro-15β-methyl-17α,21-dihydroxy-4-pregnene - 3,11,20 - trione is converted to 9α-fluoro-15β-methyl - 17α,21-dihydroxy-4-pregnene-3,11,20-trione 21-propionate (XXI).

Similarly, substituting another acylating agent for the propionic anhydride in the esterification of 9α-fluoro-15β-methyl-11β,17α,21-trihydroxy - 1,4-pregnadiene-3,20-dione (XX') or 9α-fluoro - 15β - methyl-11β,17α,21-trihy-droxy-4-pregnene-3,20-dione (XX'), e.g., in the manner described in the paragraph following Example 17, there is thus produced other 21 - acylates of 9α - fluoro - 15β-methyl - 11β,17α,21 - trihydroxy - 1,4 - pregnadiene-3,20-dione (XX) and of 9α-fluoro-15β-methyl-11β,17α,21-trihydroxy-4-pregnene-3,20-dione (XX), respectively.

EXAMPLE 1α

15-Methyl-4,15-Pregnadiene-3,11,20-Trione 3-Ethylene Ketal (IVα)

20 g. of 15-methyl-4,15 - pregnadiene - 3,11,20 - trione 3,20-bis(ethylene ketal) (IIIα) (Preparation 6) was dissolved in 600 ml. of tetrahydrofuran. This solution was purged of air by bubbling nitrogen through it for about 5 minutes. A solution of 40 ml. of 10% sulfuric acid was purged in a like manner and added to the steriod. The reactants were mixed thoroughly and allowed to stand in a nitrogen atmosphere at room temperature for a period of about 8 hours. The reaction mixture was poured into a separatory funnel containing 400 ml. of saturated sodium bicarbonate solution and 1 liter of crushed ice and water. The mixture was shaken to neutralize the excess sulfuric acid and the organic material extracted with methylene chloride. The extract was washed twice with copious amounts of water and dried over anhydrous sodium sulfate. The dried extract was concentrated to dryness by distillation under vacuum and heat generated by a water bath held at 60° C. The tan amorphous residue was dissolved in 200 ml. of methylene chloride and chromatographed over 1200 g. of Florisil. The products were eluted with 12.5% acetone in Skellysolve B. Fractions 11 to 16 contained 7.5 g. of solid material and was combined and recrystallized from methanol to give 5.14 g. of product with a melting point of 131 to 133° C. Fractions 7 to 10 contained 7 g. and consisted of a mixture of starting material and the desired compound. This material was recycled through the above-described procedure to give an additional 2.3 g. of product with a melting point of 131 to 133° C. This material was proven to be the same as the product of fractions 11 to 16, namely, 15-methyl-4,15-pregnadiene-3,11,20-trione 3-ethylene ketal (IVα); it was combined therewith.

Analysis.—Calcd. for $C_{26}H_{36}O_5$: C, 74.96; H, 8.39. Found: C, 75.23; H, 8.60. $[\alpha]_D$—23° (chloroform).

EXAMPLE 2α

15α-Methyl-4-Pregnene-3,11,20-Trione 3-Ethylene Ketal (Vα)

3.98 g. of 15-methyl-4,15-pregnadiene-3,11,20-trione 3-ethylene ketal (IVα) was dissolved in 200 ml. of absolute ethanol. This solution was purged of air with nitrogen and diluted with 200 ml. of a 1% solution of potassium hydroxide in absolute ethanol which had been similarly purged. The resulting solution, containing 15α-methyl-4,16-pregnadiene-3,11,20-trione 3-ethylene ketal, had a catalyst added thereto (250 mg. of 5% palladium on carbon) and was reacted with hydrogen until there was no further uptake of the gas, approximately 75 ml. hydrogen having been absorbed. The catalyst was removed by filtration through Celite. The filtrate was made slightly acidic with acetic acid and concentrated to near dryness by distillation under vacuum. The product precipitated as white crystalline needles which were recrystallized from methanol to give 3.95 g. of 15α-methyl-4-pregnene-3,11,20-trione 3-ethylene ketal (Vα), with a melting point of 168 to 175° C.

Analysis.—Calcd. for $C_{24}H_{34}O_4$: C, 74.57; H, 8.86. Found: C, 73.79; H, 8.57.

EXAMPLE 3α

(a) 15α-Methyl-4-Pregnene-3,11,20-Trione (15α-Methyl-11-Ketoprogesterone) (VIα); (b) 15α-Methyl-11-Keto-17(α)-Isoprogesterone (VIα')

9 g. of 15α-methyl-4-pregnene-3,11,20-trione 3-ethylene ketal (Vα) was dissolved in 400 ml. of acetone, 20 ml. of 10% sulfuric acid added thereto and the mixture heated at refluxing temperature for a period of about 15 minutes. The mixture was cooled by addition of ice and the sulfuric acid neutralized under vacuum; the resulting precipiated gummy product was extracted with methylene chloride. The extract was dried over sodium sulfate and chromatographed on a column of 600 g. of Florisil. The products were eluted with 200 m. fractions of mixtures of acetone in Skellysolve B. The first material eluted with 12.5% acetone in Skellysolve B was recovered from fractions 9 to 17; it was 15α-methyl-11-keto-17-(α)-isoprogesterone (VIα') (b) in a yield of 2.38 g. and an analytical sample thereof had a melting point of 203 to 205° C. The desired product (3.99 g.) was eluted with 15% acetone in Skellysolve B and recrystallized from ether to give 3.5 g. of 15α-methyl-4-pregnene-3,11,20-trione (VIα) (a), with a melting point of 142 to 144° C., $[\alpha]_D$ 292° (chloroform) and $\lambda_{max.}$ 238 mμ; ($\epsilon$=15,700).

*Analysis.*—Calcd. for $C_{22}H_{30}O_3$: C, 77.15; H, 8.83, Found: C, 76.91; H, 8.89.

The 17(α)-iso material (2.38 g.) was combined with two fractions of a mixture of isomers (0.26 g.) and dissolved in 100 ml. of acetone. This solution was treated with 10 ml. of 10% sulfuric acid as previously described to equilibrate the 17(α)-iso material to the normal and iso fractions. The total crude product was chromatographed over a 200 g. column of Florisil. Elution with 12.5% acetone in Skellysolve B gave 0.98 g. of long white needles of 15α-methyl-11-keto-17(α)-isoprogesterone (VIα') (b) melting at 201 to 205° C. Elution of the column with 15% acetone in Skellysolve B yielded 1.3 g. of 15α-methyl-4-pregnene-3,11,20-trione (VIα) (a) with a melting point of 142 to 144° C. The infrared spectrum of this compound was identical to that of the previously isolated 17-normal compound (VIα).

EXAMPLE 4α

*Methyl 15α-Methyl-3,11-Diketo-4,17(20) Pregnadiene-21-Oate (VIIα)*

15α-methyl-4-pregnene-3,11,20-trione (VIα) (3.43 g.) was dissolved in 40 ml. of t-butyl alcohol by warming the mixture to 60° C. in a flask fitted with a stirrer, thermometer, dropping funnel and protected from atmospheric moisture. Ethyl oxalate, 5.42 ml., and 5.4 ml. of 25% sodium methoxide in methanol was added while the temperature was approximately 50° C. The reaction mixture was stirred for about 15 minutes and a solution of 1.72 g. of sodium acetate and 1.44 ml. of acetic acid in 100 ml. of methanol was added. The temperature of the reaction mixture dropped to ca. 25 to 30° C. The mixture was stirred for about 5 minutes and then cooled to 0° C. by means of an ice-salt bath. A precooled (5° C.) solution of 5.0 g. of bromine in 50 ml. of methanol was aded dropwise over a period of about 15 minutes while the reaction temperature remained at 0° C. After the addition of the bromine solution was completed, the reaction temperature was allowed to rise to from 22 to 25° C. as the mixture was stirred for about 2.5 hours. The mixture was then treated with 7.5 ml. of acetic acid and 1.53 g. of zinc powder for about 15 minutes at room temperature. The crude product was precipitated by pouring the reaction mixture into 400 ml. of crushed ice and water. The steriod was extracted with methylene chloride and the extract dried over anhydrous sodium sulfate. The dried extract was chromatographer over 200 g. of Florisil. The product was eluted with 100 ml. portions of 10% acetone in Skellysolve B. Fractions 11 to 26, inclusive, were recrystallized from ether to give 1.95 g. of methyl 15α-methyl-3,11-diketo-4,17(20)-pregnadiene-21-oate (VIIα) with a melting point of 156 to 166° C., $[\alpha]_D$ 224° (chloroform) and $\lambda_{max.}$ 234 mμ; ($\epsilon$=23,150).

*Analysis.*—Calcd. for $C_{23}H_{30}O_4$: C, 74.56; H, 8.16. Found: C, 74.34; H, 8.13.

EXAMPLE 5α

*15α-Methyl-11β,21-Dihydroxy-4,17(20)-Pregnadien-3-One 21-Acetate (VIIIα)*

Methyl 15α - methyl-3,11-diketo-4,17(20)-pregnadien-21-oate (VIIα) (1.76 g.) was dissolved in 40 ml. of benzene in a flask fitted with a nitrogen inlet tube, a stirrer, a Dean-Stark water trap and reflux condenser. Pyrrolidine (0.8 ml.) and toluenesulfonic acid-monohydrate (25 mg.) were added and the reaction mixture stirred and heated at refluxing temperature for about 45 minutes in a nitrogen atmosphere. The apparatus was changed so that the benzene and excess pyrrolidine were removed by distillation in vacuo from a water bath at 50° C. The brown residue was redissolved in 30 ml. of benzene. This solution was added to a suspension of 0.8 g. of lithium aluminum hydride in 50 ml. of anhydrous ether and the reaction mixture was stirred for about one hour, protected from atmospheric moisture. The excess lithium aluminum hydride was decomposed by the cautious dropwise addition of 5 ml. of ethyl acetate followed by 5 ml. of water. The reaction mixture was distilled in vacuo during heating on a water bath at 50° C. until approximately 80% of the organic solvents had been removed. The residue was taken up in 50 ml. of methanol and was treated with 10 ml. of 5% sodium hydroxide at 45° C. for about 10 minutes. The mixture was made barely acid to test paper with acetic acid and then concentrated to a volume of about 25 ml. by distillation in vacuo. The inorganic salts were removed by filtration through a Celite pad. The pad was thoroughly washed with methylene chloride and the filtrate was partitioned between water and methylene chloride. The combined methylene chloride extracts were dried over anhydrous sodium sulfate and concentrated to dryness by distillation in vacuo on a water bath at 40° C. The residue, 1.75 g. of a light tan amorphous material was dissolved in 10 ml. of pyridine and treated with 3 ml. of acetic anhydride at room temperature overnight. The reaction mixture was poured into 100 ml. of ice and water and allowed to stand for one hour. The product precipitated as a heavy gum which was extracted with methylene chloride. The extract was dried over anhydrous sodium sulfate and chromatographed over a 230 g. column of Florisil. The column was developed with 100 ml. fractions of 10% and 15% acetone, respectively, in Skellysolve B. The product was found in fractions 8 to 14, inclusive, eluted with 10% acetone in Skellysolve B. The yield was 860 mg. of a white semicrystalline material, 15α - methyl-11β,21-dihydroxy-4,17-(20)-pregnadien-3-one 21-acetate (VIIIα). The structure was confirmed as being that of the desired product by infrared and nuclear magnetic resonance spectroscopy.

EXAMPLE 6α

*15α-Methyl-11β,17α,21 - Trihydroxy - 4 - Pregnene-3,20-Dione 21-Acetate (15α - Methylhydrocortisone 21-Acetate) (IXα)*

15α - methyl-11β,21-dihydroxy-4,17(20)-pregnadien-3-one 21-acetate (VIIIα) (765 mg.) was dissolved in 48 ml. of t-butyl alcohol. This solution was treated with 0.36 ml. of pyridine, 1.2 mg. of osmium tetroxide and 3.0 ml. of N-methylmorpholine oxide peroxide solution (titration of 42.0 ml. N/10 sodium thiosulfate per ml.) for about 20 hours at room temperature. The osmic ester was decomposed by treating the reaction mixture with 5 ml. of 5% sodium hydrosulfite solution for about 30 minutes at room temperature. The mixture was diluted with 20 ml. of water and the t-butyl alcohol was distilled in vacuo while being heated on a water bath at 50° C. The gummy residue in water was extracted with methylene chloride. After drying the extract over anhydrous sodium sulfate, it was chromatographed over a 56 g. column of Florisil. The column was developed with 50 ml.

portions of 10% and 20% acetone, respectively, in Skellysolve B. Fractions 14 to 18, inclusive, (296 mg.) eluted with 20% acetone in Skellysolve B were combined and recrystallized from acetone-Skellysolve B to give, in two crops, 210 mg. of 15α-methyl-11β,17α,21-trihydroxy-4-pregnene-3,20-dione 21-acetate (IXα) melting at 231 to 235° C.; [α]$_D$+175° (chloroform).

Analysis.—Calcd. for $C_{24}H_{34}O_6$: C, 68.87; H, 8.19. Found: C, 68.63; H, 8.26.

The infra red spectrum was in agreement with the proposed structure.

Following the procedure of Example 6α, but instead of 15α-methyl-11β,21 - dihydroxy - 4,17(20) - pregnadien-3-one 21-acetate (VIIIα) substituting another corresponding 21-acylate therefor, e.g., one of those disclosed at the end of Example 15, produces the corresponding 15α-methylhydrocortisone 21-acylate (IXα).

EXAMPLE 7α

*15α-Methyl-11β,17α,21-Trihydroxy-4-Pregnene-3,20-Dione (15α-Methylhydrocortisone) (IXα')*

Following the procedure of Example 17, but substituting 15α-methylhydrocortisone 21-acetate as starting material, yields the corresponding 15α - methylhydrocortisone (IXα').

In the same manner as disclosed in the paragraph following Example 17, the corresponding 15α-epimer (IX') of 15β-methylhydrocortisone can be converted to numerous desired 21-esters (IX).

Likewise, following the procedure of Example 17, but substituting another 21-acylate of 15α-methylhydrocortisone (IXα) as starting material also yields 15α-methylhydrocortisone (IXα').

EXAMPLE 8α

*15α-Methyl-11β,17α,21 - Trihydroxy - 1,4 - Pregnadiene-3,20-Dione (15α - Methyl - 1 - Dehydrohydrocortisone) (15α-Methylprednisolone) (Xα)*

Following the procedure of Example 18, but employing instead 15α-methylhydrocortisone (IXα') as starting material, yields the corresponding 15α-epimer, 15α-methylprednisolone (Xα).

EXAMPLE 9α

*15α-Methyl-11β,17α,21-Trihydroxy-1,4-Pregnadiene-3,20-Dione (15α-Methylprednisolone) (Xα)*

Following the procedure of Example 18, but substituting a 15α-methyl-11β,17α,21-trihydroxy-4-pregnene-3,20-dione 21-acylate (IXα) as starting material, is productive of 15α-methyl-11β,17α,21 - trihydroxy - 1,4 - pregnadiene-3,20-dione (15α-methylprednisolone) (Xα).

In the manner of the procedure disclosed in the paragraph following Example 17, 15α-methylprednisolone (Xα) is converted to desired 21-esters such as 15α-methylprednisolone 21-acetate (IXα), 15α-methylprednisolone 21-butyrate (IXα), 15α-methylprednisolone 21-β-cyclopentylpropionate (IXα), 15α-methylprednisolone 21-benzenesulfonate (IXα) and the like.

EXAMPLE 10α

*15α-Methyl-17α,21-Dihydroxy-1,4-Pregnadiene-3,11,20-Trione 21-Acetate (15α-Methylprednisone) (XIα)*

Following the procedure of Example 20, but employing instead 15α-methyl-11β,17α,21-trihydroxy-1,4-pregnadiene-3,20-dione 21-acetate (Xα') as starting material, is productive of 15α-methyl-17α,21-dihydroxy-1,4-pregnadiene-3,11,20-trione 21-acetate (XIα).

EXAMPLE 11α

*15α-Methyl-17α21-Dihydroxy-4-Pregnene-3,11,20-Trione-21-Acetate (15α-Methylcortisone 21-Acetate) (XIα)*

Following the procedure of Example 21, but employing instead 15α-methyl-11β,17α,21-trihydroxy-4-pregnene-3,20-dione 21-acetate (IXα) as starting material, is productive of 15α-methyl - 17α,21 - dihydroxy - 4 - pregnene-3,11,20-trione 21-acetate (XIα).

Similarly, substituting another 21-acylate of 15α-methyl-11β,17α,21-trihydroxy - 1,4 - pregnadiene - 3,20 - dione (Xα') or 21-acylate of 15α-methyl-11β,17α,21-trihydroxy-4-pregnene-3,20-dione (IXα) wherein the acyl radical is, e.g., that of an acid named in the paragraph following Example 17, as the starting compound in the oxidation reaction described in Example 20, there is thus produced the corresponding 21-acylate of 15α-methyl-17α,21-dihydroxy-1,4-pregnadiene-3,11,20-trione (XIα) and of 15α-methyl-17α,21-dihydroxy - 4 - pregnene - 3,11,20 - trione (XIα), respectively.

EXAMPLE 12α

*15α-Methyl-17α,21-Dihydroxy-4,9(11)-Pregnadiene-3,20-Dione 21-Acetate (XIIα)*

15α-methyl hydrocortisone 21-acetate (IXα) (1.0 g.) was dissolved in 15.5 ml. of pyridine and treated at room temperature in a nitrogen atmosphere with 730 mg. of N-bromoacetamide for about 15 minutes. The mixture was cooled to 5° C. and sulfur dioxide was bubbled therethrough until a color change from yellow to orange occurred and the mixture gave a negative test to starch-potassium iodide paper. The mixture was poured into 200 ml. of ice and water and the crude product collected by filtration and air dried at room temperature. The crude product was dissolved in 50 ml. of methylene chloride and chromatographed over 80 g. of Florisil with 50 ml. fractions of mixtures of acetone in Skellysolve B. The product was eluted with 15% acetone in Skellysolve B. 10 fractions were combined to yield 823 mg. of material which was recrystallized from ether to give 700 mg. of 15α-methyl-17α,21-dihydroxy - 4,9(11) - pregnadiene-3,20-dione 21-acetate (XIIα) melting at 215 to 217° C., λ$_{max}$ 239.5, ϵ=16,950.

Analysis.—Calcd. for $C_{24}H_{32}O_5$: C, 71.99; H, 8.05. Found: C, 71.64; H, 7.93.

EXAMPLE 13α

*15α-Methyl-17α,21-Dihydroxy-1,4,9(11)-Pregnatriene-3,20-Dione 21-Acetate (XIIα)*

Following the procedure of Example 12α, but substituting 15α-methylprednisolone 21-acetate (Xα) as the starting compound, there is thus produced 15α-methyl-17α,21-dihydroxy-1,4,9(11)-pregnatriene-3,20 - dione 21-acetate (XIIα).

Similarly, substituting another 21-acylate of 15α-methylprednisolone 21-acetate (Xα) or a 21-acylate of 15α-methylhydrocortisone (IXα) wherein the acyl radical is, e.g., that of an acid named in the paragraph following Example 17, as the starting compound in Example 12α, there is thus produced the corresponding 21-acylate of 15α-methyl-17α,21-dihydroxy - 1,4,9(11) - pregnatriene-3,20-dione (XIIα) and of 15α-methyl-17α,21-dihydroxy-4,9(11)-pregnadiene-3,20-dione (XIIα).

EXAMPLE 14α

*9α-Bromo-15α-Methyl-11β,17α,21-Trihydroxy - 4 - Pregnene-3,20-Dione 21-Acetate (9α-Bromo - 15α - Methylhydrocortisone 21-Acetate) (XIIIα)*

15α-methyl-17α,21-dihydroxy-4,9(11)-pregnadiene-3,20-dione 21-acetate (XIIα) (466 mg.) was dissolved in 8 ml. of methylene chloride and 22 ml. of t-butyl alcohol. A solution of 1.5 ml. of 70% perchloric acid in 9.6 ml. of water was added and the reaction mixture stirred with 200 mg. of N-bromacetamide in 6.4 ml. of t-butyl alcohol for about 15 minutes at room temperature. The excess N-bromoacetamide was decomposed by adding 2.9 of sodium sulfite in 13.3 ml. of water. The reaction mixture was distilled in vacuo to a volume of approximately 50 ml. and then diluted with 50 ml. of cold water. The precipitated product, 9α-bromo-15α-methylhydrocortisone 21-acetate (XIIIα), was collected by filtration with suction.

Example 15α

9α - Bromo - 15α - Methyl - 11β,17α,21 - Trihydroxy-1,4-Pregnadiene - 3,20 - Dione 21-Acetate (9α-Bromo-15α-Methylprednisolene 21-Acetate) (XIIIα)

Following the procedure of Example 14α, but substituting 15α-methyl-17α,21 - dihydroxy - 1,4,9(11) - pregnatriene-3,20-dione 21-acetate (XIIα) as the starting compound, there is thus produced 9α-bromo-15α-methyl-11β,17α,21-trihydroxy-1,4-pregnadiene-3,20-dione 21-acetate (XIIIα).

Similarly, substituting another 21-acylate of 15α-methyl-17α,21 - dihydroxy - 1,4,9(11) - pregnatriene - 3,20 dione (XIIα) or a 21-acylate of 15α-methyl-17α,21-dihydroxy-4,9(11)-pregnadiene-3,20-dione (XIIα) wherein the acyl radical is, e.g., that of an acid named in the paragraph following Example 17, as the starting compound in Example 14α, there is thus produced the corresponding 21-acylate of 9α-bromo - 15α - methyl-11β,17α,21-trihydroxy-1,4-pregnadiene-3,20-dione (XIIIα) and of 9α-bromo-15α-methyl - 11β,17α,21 - trihydroxy - 4 - pregene-3,20 - dione (XIIIα), respectively.

Substituting N-chlorosuccinimide for the N-bromoacetamide in the reactions described in Examples 14α and 15α and the paragraph following Example 15α is productive of the corresponding 9α-chloro compounds, e.g., 9α-chloro-15α - methyl-11β,17α,21-trihydroxy-4-pregnene-3,20-dione 21-acetate (XIIIα) and 9α-chloro-15α-methyl-11β,17α,21-trihydroxy - 1,4 - pregnadiene - 3,20 - dione 21 - acetate (XIIIα).

Example 16α

15α - Methyl - 9β,11β - Epoxy - 17α,21 - Dihydroxy-4-Pregnene-3,20-Dione 21-Acetate (XIVα)

The crude 9α-bromo-15α-methylhydrocortison 21-acetate (XIIIα) prepared in Example 14α was dissolved in 50 ml. of acetone and heated at refluxing temperature with 640 mg. of anhydrous potassium acetate for about 18 hours. The acetone was removed by distillation in vacuo and the residue was partitioned between methylene chloride and water. The methylene chloride extract was dried over anhydrous sodium sulfate and chromatographed over a column of 35 g. of Florisil. The product was eluted with 50 ml. fractions of 15% acetone in Skellysolve B. 10 crystalline fractions were combined to give 310 mg. of 15α - methyl - 9β,11β - epoxy - 17α,21 - dihydroxy - 4-pregnene-3,20-dione 21-acetate (XIVα), with a melting point of 190 to 194° C. $\lambda_{max}$. 244; $\epsilon$=14,800.

*Analysis.*—Calcd. for $C_{24}H_{32}O_6$: C, 69.20; H, 7.74. Found; C, 68.96; H, 7.37.

Example 17α

15α - Methyl - 9β,11β - Epoxy - 17α,21 - Dihydroxy-1,4-Pregnadiene-3,20-Dione 21-Acetate (XIVα)

Following the procedure of Example 16α, but substituting 9α-bromo - 15α - methyl-11β,17α,21-trihydroxy-1,4-pregnadiene-3,20-dione 21-acetate (XIIIα) as the starting compound, there is thus produced 15α-methyl-9β,11β-epoxy - 17α,21-dihydroxy-1,4-pregnadiene-3,20-dione 21-acetate (XIVα).

Similarly, substituting another 21-acylate of 9α-bromo-15α - methyl - 11β,17α,21 - trihydroxy - 1,4 - pregnadiene-3,20 -dione (XIIIα) or a 21 - acylate of 9α - bromo - 15α-methyl - 11β,17α,21 - trihydroxy - 4 - pregnene - 3,20-dione (XIIIα) wherein the acyl radical is, e.g., that of an acid named in the paragraph following Example 17, as the starting compound in the reaction described in Example 16α, there is thus produced the corresponding 21-acylate of 15α - methyl - 9β,11β-epoxy-17α,21-dihydroxy-1,4-pregnadiene-3,20-dione (XIVα) and of 15α-methyl-9β,11β - epoxy - 17α,21 - dihydroxy - 4 - pregnene - 3,20-dione (XIVα), respectively.

Example 18α

9α - Fluoro - 15α - Methyl - 11β,17α,21 - Trihydroxy - 4 - Pregnene - 3,20 - Dione 21 - Acetate (9α - Fluoro - 15α - Methylhydrocortisone 21-Acetate) (XVα)

15α - methyl - 9β,11β - epoxy - 17α,21-dihydroxy - 4-pregnene-3,20-dione 21-acetate (XIVα) (310 mg.) was dissolved in 6.5 ml. of methylene chloride. Anhydrous hydrogen fluoride (2.25 g.) cooled to —50° C. in an acetone-dry ice bath was added to 3.88 ml. of tetrahydrofuran also cooled to —50° C. in the same manner. The solution of the steroid was added to this mixture and the reaction mixture was allowed to stand at —5° C. for about 20 hours. The excess hydrogen fluoride was neutralized by pouring the reaction mixture into ice and sodium bicarbonate solution. The organic phase was separated and the aqueous phase was further extracted with methylene chloride. The combined organic extracts were dried over anhydrous sodium sulfate and then chromatographed over a 24 g. column of Florisil. The column was eluted with 20 ml. fractions of 25% acetone in Skellysolve B. The product was found in the combined eluates of 5 fractions which gave 250 mg. of material. This was recrystallized from ether to give 144 mg. of 9α-fluoro-15α-methylhydrocortisone 21-acetate (XVα), melting at 248° to 252° C. (with decomposition). $\lambda_{max}$. 239 mu; $\epsilon$=16,450.

*Analysis.*—Calcd. for $C_{24}H_{33}O_6F$: C, 66.03; H, 7.62; F, 4.34. Found: C, 66.26; H, 7.47.

Example 19α

9α - Fluoro - 15α - Methyl - 11β,17α,21 - Trihydroxy-1,4-Pregnadiene - 3,20-Dione 21 - Acetate (9α-Fluoro-15α-Methylprednisolone 21-Acetate) (XVα)

Following the procedure of Example 18α, but substituting 15α - methyl - 9β,11β-epoxy-17α,21-dihydroxy-1,4-pregnadiene-3,20-dione 21-acetate (XIVα) as the starting compound, there is thus produced 9α-fluoro-15α-methyl-11β,17α,21 - trihydroxy - 1,4 - pregnadiene - 3,20 - dione 21-acetate (XVα).

Similarly, substituting another 21-acylate of 15α-methyl-9β,11β - epoxy - 17α,21 - dihydroxy - 1,4 - pregnadiene-3,20-dione (XIVα) or a 21-acylate of 15α-methyl-9β,11β-epoxy - 17α,21 - dihydroxy-4-pregnene-3,20-dione (XIVα) wherein the acyl radical is, e.g., that of an acid named in the paragraph following Example 17, as the starting compound in the reaction described in Example 18α, there is thus produced the corresponding 21-acylate of 9α-fluoro-15α - methyl - 11β,17α,21 - trihydroxy - 1,4 - pregnadiene-3,20 - dione (XVα) and of 9α - fluoro - 15α - methyl - 11β, 17α,21-trihydroxy-4-pregnene-3,20-dione (XVα), respectively.

Example 20α

9α-Fluoro-15α-Methyl-11β,17α,21-Trihydroxy - 1,4-Pregnadiene-3,20-Dione 21-Acetate (9α-Fluoro-15α-Methylprednisolone 21-Acetate) (XVα)

9α-fluoro-15α - methylhydrocortisone acetate (XVα) (228 mg.) was dissolved in 17 ml. of t-butyl alcohol and 0.425 ml. of acetic acid. This solution was heated with 150 mg. of previously dried (by fusing in vacuo) selenium oxide at refluxing temperature for about 24 hours. The mixture was cooled to room temperature and filtered through a pad of Celite filter aid. The filtrate was concentrated to dryness by distillation in vacuo and extracted with ethyl acetate. The extract was washed successively with sodium bicarbonate solution, ice cold freshly prepared ammonium polysulfide, aqueous ammonia, dilute hydrochloric acid, sodium bicarbonate solution and water. The extract was dried over anhydrous sodium sulfate and concentrated to dryness in vacuo from a water bath at 50° C. The residue 180 mg. was dissolved in 15 ml. of methylene chloride and chromatographed over 25 g. of Florisil. The product was eluted with 20 ml. of fractions of acetone in Skellysolve B. Five combined fractions eluted with 25% acetone in Skellysolve B gave 101 mg. of material which was recrystallized from acetone-Skellysolve B to give 70 mg. of 9α-fluoro-15α-methylprednisolone al-acetate (XVα), melting at 226 to 269° C.; $\lambda_{max}$. 239 mu; $\epsilon$=14,950.

*Analysis.*—Calcd for $C_{24}H_{31}O_6F$: H, 66.34; H, 7.19; F, 4.37. Found: C, 65.9; H, 7.57; F, 4.30.

EXAMPLE 21α

9α-Fluoro - 15α-Methyl - 17α,21-Dihydroxy-1,4 - Pregnadiene-3,11,20-Trione 21-Acetate (9α-Fluoro-15α-Methylprednisone 21-Acetate) (XVIα)

Following the procedure of Example 30, but substituting 9α-fluoro-15α-methyl-11β,17α,21-trihydroxy-1,4-pregnadiene-3,20-dione 21-acetate (XVα) as the starting compound, there is thus produced 9α-fluoro-15α-methyl-17α,21-dihydroxy-1,4-pregnadiene-3,11,20-trione 21 - acetate (XVIα).

EXAMPLE 22α

9α-Fluoro-15α-Methyl-17α,21-Dihydroxy - 4 - Pregnene-3,11,20-Trione 21-Acetate (9α-Fluoro-15α-Methylcortisone 21-Acetate) (XVIα)

Following the procedure of Example 30, but substituting 9α-fluoro-15α-methyl - 11β,17α,21-trihydroxy-4-pregnene-3,20-dione 21-acetate (XVα) as the starting compound, there is thus produced 9α-fluoro-15α-methyl-17α,21-dihydroxy-4-pregnene-3,11,20 - trione 21 - acetate (XVIα).

Similarly, substituting another 21-acylate of 9α-fluoro-15α - methyl-11β,17α,21-trihydroxy-1,4-pregnadiene-3,20-dione (XVα) wherein the acyl radical is, e.g., that of an acid named in the paragraph following Example 17, as the starting compound in the oxidation reaction described in Example 30, there is thus produced the corresponding 21-acylate of 9α-fluoro-15α-methyl-17α,21-dihydroxy-1,4-pregnadiene-3,11,20-trione (XVIα) and of 9α-fluoro-15α-methyl-17α,21 - dihydroxy-4-pregnene - 3,11,20 - trione (XVIα), respectively.

EXAMPLE 23α

9α-Fluoro-15α-Methyl - 11β,17α21 - Trihydroxy-1,4-pregnadiene-3,20-Dione (9α - Fluoro-15α-Methylprednisolone) (XVα')

Following the procedure of Example 32, but substituting 9α-fluoro-15α methyl 11β,17α,21-trihydroxy-1,4-pregnadiene-3,20-dione 21-acetate (XVα) as the starting compound, there is thus produced 9α-fluoro-15α-methyl-1,4-pregnadiene-3,20-dione (XVα').

EXAMPLE 24α

9α-Fluoro-15α-Methyl-11β,17α,21 - Trihydroxy - 4 - pregnene-3,20-Dione (9α-Fluoro - 15α - Methylhydrocortisone) (XVα')

Following the procedure of Example 32, but substituting 9α-fluoro-15α-methyl-11β,17α,21 - trihydroxy-4-pregnene 3,20-dione 21-acetate (XVα) as the starting compound, there is thus produced 9α-fluoro-15α-methyl-11β,17α,21-trihydroxy-4-pregnene-3,20-dione (XVα').

Similarly, 9α-fluoro-15α-methyl-17α,21-dihydroxy - 4-pregnene-3,11,20-trione 21-acetate (XVIα) is hydrolyzed to 9α-fluoro-15α-methyl-17α,21-dihydroxy - 1,4 - pregnadiene-3,11,20-trione 21-acetate is hydrolyzed to 9α-fluoro-15α-methyl-17α,21 - dihydroxy-1,4-pregnadiene - 3,11,20-trione. The corresponding 9α-chloro compounds are similarly prepared by hydrolysis of their 21-acetates, e.g., 9α-chloro-15α-methyl-11β,17α,21-trihydroxy - 1,4-pregnadiene-3,20-dione and 9α-chloro-15α-methyl-11β,17α,21-trihydroxy-4-pregnene-3,20-dione are prepared from 9α-chloro-15α - methyl - 11β,17α,21-trihydroxy-1,4-pregnadiene-3,20-dione 21-acetate and 9α-chloro-15α-methyl-11β,17α,21-trihydroxy-4-pregnene-3,20-dione 21-acetate respectively.

EXAMPLE 24αA

9α-Fluoro-15α- - Methyl-11β,17α,21 - Trihydroxy-4-Pregnene-3,20-Dione 21-Hemisuccinate, Sodium Salt (XVα)

(a) A solution was prepared containing excess succinic anhydride and 9α-fluoro-15α-methyl-11β,17α,21-trihydroxy-4-pregnene-3,20-dione (XVα') (prepared in the manner disclosed in Example 24α) in pyridine. The solution was allowed to stand for about 20 hours, diluted with water and the mixture refrigerated and filtered. The precipitate collected on the filter was recrystallized twice from methanol to yield 9α-fluoro-15α-methyl-11β,17α,21-trihydroxy-4-pregnene - 3,20 - dione 21 - hemisuccinate (XVα).

(b) 0.1 Normal sodium hydroxide solution was slowly added to a stirred solution of 9α-fluoro-15α-methyl-11β,17α,21-trihydroxy-4-pregnene-3,20-dione 21-hemisuccinate dissolved in acetone, until the pH rose to about 7.4. During the addition of sodium hydroxide solution a small amount of water was also added. The solution was concentrated at room temperature under vacuum to remove the acetone. The aqueous solution was filtered, freeze-dried and recrystallized to give pure 9α-fluoro-15α-methyl-11β,17α,21 - trihydroxy - 4 - pregnene - 3,20 - dione 21-hemisuccinate, sodium salt (XVα).

Following the procedure of Example 24αA, but substituting as starting materials, 9α-fluoro-15α-methyl-11β,17α,21-trihydroxy-1,4 - pregnadiene - 3,20 - dione (XVα'), 15α - methyl-11β,17α,21-trihydroxy-4-pregnene-3,20-dione (IXα') and 15α-methyl-11β,17α,21-trihydroxy-1,4-pregnadiene-3,20-dione (Xα) (prepared in the manner disclosed in Examples 23α, 7α and 8α, respectively) is productive of 9α-fluoro-11β,17α,21-trihydroxy-1,4-pregnadiene-3,20-dione 21-hemisuccinate, sodium salt (XVα), 15α - methyl - 11β,17α,21 - trihydroxy-4-pregnene-3,20-dione 21-hemisuccinate, sodium salt (IXα) and 15α-methyl-11β,17α,21 - trihydroxy - 1,4 - pregnadiene-3,20-dione 21-hemisuccinate, sodium salt (Xα'), respectively.

EXAMPLE 25α

9α-Fluoro-15α-Methyl-11β,17α,21-Trihydroxy-1,4 - Pregnadiene-3,20-Dione 21 - Propionate (9α-Fluoro-15α-Methylprednisolone 21-Propionate) (XVα)

Following the procedure of Example 34, but substituting 9α-fluoro-15α-methyl-11β,17α,21-trihydroxy-1,4-pregnadiene-3,20-dione (XVα') as the starting compound, there is thus produced 9α-fluoro-15α-methyl-11β,17α,21-trihydroxy - 1,4 - pregnadiene - 3,20-dione 21-propionate (XVα).

EXAMPLE 26α

9α-Fluoro-15α - Methyl - 11β,17α,21 - Trihydroxy-4-Pregnene-3,20-Dione 21-Propionate (9α-Fluoro-15α-Methylhydrocortisone 21-Propionate) (XVα)

Following the procedure of Example 34, but substituting 9α-fluoro-15α - methyl-11β,17α,21-trihydroxy-4-pregnene-3,20-dione (XVα') as starting compound, there is thus produced 9α - fluoro-15α-methyl-11β,17α,21-trihydroxy-4-pregnene-3,20-dione 21-propionate (XVα).

Similarly, 9α - fluoro-15α-methyl-17α,21-dihydroxy-1,4-pregnadiene-3,11,20-trione is converted to 9α-fluoro-15α-methyl-17α,21-dihydroxy-1,4-pregnadiene - 3,11,20-trione 21-propionate (XVIα) and 9α-fluoro-15α-methyl-17α,21-dihydroxy-4-pregnene-3,11,20-trione is converted to 9α-fluoro-15α-methyl-17α,21-dihydroxy - 4-pregnene-3,11,20-trione 21-propionate (XVIα).

Similarly, substituting another acylating agent for the propionic anhydride in the esterification of 9α-fluoro-15α-methyl - 11β,17α,21-trihydroxy - 1,4-pregnadiene-3,20-dione (XVα') or 9α-fluoro-15α-methyl-11β,17α,21-trihydroxy-4-pregnene-3,20-dione (XVα'), e.g., in the manner described in the paragraph following Example 17, there is thus produced other 21-acylates of 9α-fluoro-15α-methyl-11β,17α,21-trihydroxy-1,4-pregnadiene - 3,20 - dione (XVα) and of 9α-fluoro-15α-methyl - 11β,17α,21-trihydroxy-4-pregnene-3,20-dione (XVα), respectively.

The compounds produced in Examples 7A, 7B and 7D exhibit tranquilizing and sedative properties with decreased anesthetic effects.

We claim:
1. Compounds of the formula

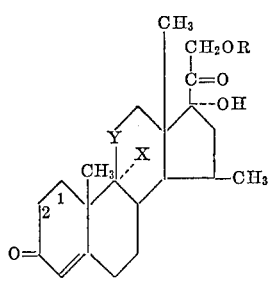

wherein the 1,2-carbon linkage is selected from the group consisting of single bonds and double bonds; X is selected from the group consisting of hydrogen and fluorine; Y is selected from the group consisting of the β-hydroxymethylene radical,

and the carbonyl radical, >C=O, R is selected from the group consisting of hydrogen and the acyl radical of a hydrocarbon carboxylic acid containing from one to twelve carbon atoms, inclusive.

2. 15β - methyl - 11β,17α,21 - trihydroxy - 4 - pregnene-3,20-dione.

3. 15β - methyl - 11β,17α,21 - trihydroxy - 4 - pregnene-3,20-dione 21-acetate.

4. 9α-fluoro - 15β - methyl - 11β,17α,21 - trihydroxy-4-pregnene-3,20-dione 21-acylate wherein the acyl radical is that of a hydrocarbon carboxylic acid containing from one to twelve carbon atoms, inclusive.

5. 15β - methyl - 11β,17α,21 - trihydroxy - 1,4 - pregnadiene-3,20-dione.

6. 15β - methyl - 11β,17α,21 - trihydroxy - 1,4 - pregnadiene-3,20-dione 21-acylate wherein the acyl radical is that of a hydrocarbon carboxylic acid containing from one to twelve carbon atoms, inclusive.

7. 9α - fluoro 1 15β - methyl - 11β,17α,21 - trihydroxy-1,4-pregnadiene-3,20-dione.

8. 9α - fluoro - 15β - methyl - 11β,17α,21 - trihydroxy-1,4-pregnadiene - 3,20 - dione 21-acylate wherein the acyl radical is that of a hydrocarbon carboxylic acid containing from one to twelve carbon atoms, inclusive.

9. Compounds of the formula

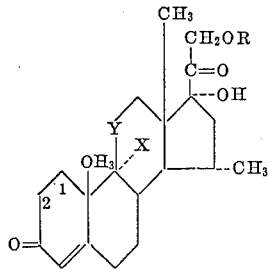

wherein the 1,2-carbon linkage is selected from the group consisting of single bonds and double bonds; X is selected from the group consisting of hydrogen and fluorine; Y is selected from the group consisting of the β-hydroxymethylene radical,

and the carbonyl radical, >C=O; R is selected from the group consisting of hydrogen and the acyl radical of a hydrocarbon carboxylic acid containing from one to twelve carbon atoms, inclusive.

10. 15α - methyl - 11β,17α,21 - trihydroxy - 4 - pregnene-3,20-dione.

11. 15α - methyl - 11β,17α,21 - trihydroxy - 4 - pregnene-3,20-dione 21-acetate.

12. 9α - fluoro - 15α - methyl - 11β,17α,21-trihydroxy-4-pregnene-3,20-dione.

13. 9α - fluoro - 15α -methyl - 11β,17α,21 - trihydroxy-4-pregnene-3,20-dione 21-acetate.

14. 9α - fluoro - 15α - methyl - 11β,17α,21 - trihydroxy-1,4-pregnadiene-3,20-dione.

15. 9α - fluoro - 15α - methyl - 11β,17α,21 - trihydroxy-1,4-pregnadiene-3,20-dione 21-acylate wherein the acyl radical is that of a hydrocarbon carboxylic acid containing from one to twelve carbon atoms, inclusive.

16. 9α - fluoro - 15α - methyl - 11β,17α,21 - trihydroxy-1,4-pregnadiene-3,20-dione 21-acetate.

17. 9α - fluoro - 15β - methyl - 11β,17α,21-trihydroxy-4-pregnene-3,20-dione 21-acetate.

18. 9α - fluoro - 15β - methyl - 11β,17α,21 - trihydroxy-1,4-pregnadiene-3,20-dione 21-acetate.

19. A process for the production of a compound of the Formula Vα

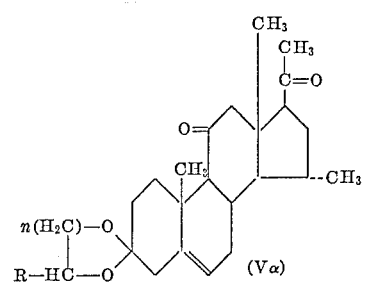

wherein n is an integer selected from the group consisting of one and two and R is selected from the group consisting of hydrogen and a lower alkyl radical containing from to six carbon atoms, inclusive, which comprises (1) selectively hydrolyzing under mildly acidic conditions at the 20-position a compound of the Formula IIIα

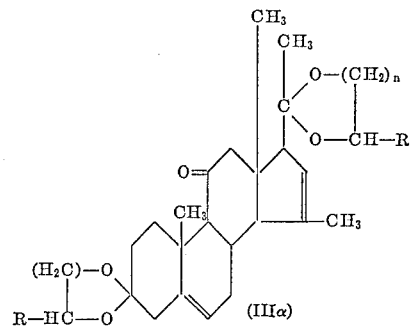

wherein n and R have the same meanings as above, to yield a corresponding 3-monoketal compound (IVα), (2) isomerizing with alkanolic alkali at the Δ15(16)-position a thus produced compound (IVα) to yield a corresponding 3-monoketal-15α-methyl-Δ16(17)-compound (IVα'), and (3) reducing with hydrogen in the presence of a catalyst at the Δ16(17)-position a thus produced compound (IVα') to yield a compound of Formula Vα, above.

20. A process for the production of a compound of the formula (X)

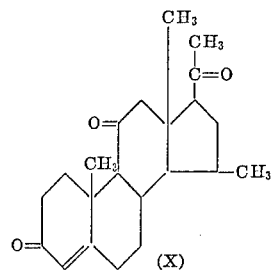

which comprises (1) reducing at the 15(16)-position a compound of the Formula IIIα

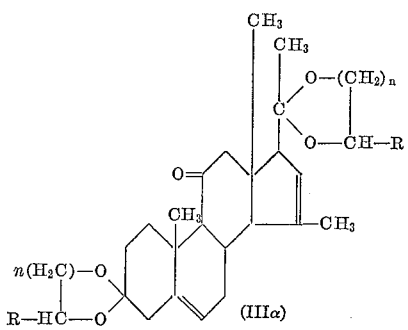

wherein $n$ is an integer selected from the group consisting of one and two and R is selected from the group consisting of hydrogen and a lower alkyl radical containing from one to six carbon atoms, inclusive, to yield a corresponding 15β-methyl-15(16)-saturated compound and (2) hydrolyzing a thus produced compound to yield the compound of Formula X, above.

References Cited in the file of this patent
UNITED STATES PATENTS

| | | |
|---|---|---|
| 3,021,327 | Beal et al. | Feb. 13, 1962 |
| 3,053,864 | Beal et al. | Sept. 11, 1962 |
| 3,116,304 | Taub et al. | Dec. 31, 1963 |

OTHER REFERENCES

Fieser & Fieser: "Steroids," (1959), Reinhold Publishing Co., New York, pp. 682–689.